(12) United States Patent
Carlson

(10) Patent No.: US 6,827,100 B1
(45) Date of Patent: Dec. 7, 2004

(54) PRESSURE INDEPENDENT CONTROL VALVE

(75) Inventor: Bengt A. Carlson, Stamford, CT (US)

(73) Assignee: Belimo Holding AG

( * ) Notice: Subject to any disclaimer, the term of this patent is extended or adjusted under 35 U.S.C. 154(b) by 7 days.

(21) Appl. No.: 10/049,730

(22) PCT Filed: Aug. 17, 2000

(86) PCT No.: PCT/US00/22629

§ 371 (c)(1),
(2), (4) Date: Feb. 14, 2002

(87) PCT Pub. No.: WO01/13017

PCT Pub. Date: Feb. 22, 2001

Related U.S. Application Data

(60) Provisional application No. 60/149,399, filed on Aug. 17, 1999.

(51) Int. Cl.$^7$ ................................................. G05D 7/01
(52) U.S. Cl. ................................... 137/454.6; 137/501
(58) Field of Search ............................... 137/501, 503, 137/454.2, 454.6

(56) References Cited

U.S. PATENT DOCUMENTS

| | | | |
|---|---|---|---|
| 2,914,083 A | 11/1959 | Cronkhite | 137/496 |
| 3,344,805 A | 10/1967 | Wapner | 137/486 |
| 3,770,007 A | 11/1973 | Orth et al. | 137/501 |
| 4,044,792 A | 8/1977 | Kjaergaard | 137/505.22 |
| 4,168,720 A | 9/1979 | Raskin | 137/505.18 |
| 4,250,915 A * | 2/1981 | Rikuta | 137/501 |
| 4,310,050 A * | 1/1982 | Bourgoyne, Jr. | 137/501 |
| 4,422,470 A | 12/1983 | Jackson et al. | 137/484.2 |
| 4,921,547 A * | 5/1990 | Kosarzecki | 137/115.09 |
| 5,009,245 A | 4/1991 | Escola et al. | 137/116.5 |
| 5,143,116 A | 9/1992 | Skoglund | 137/487 |
| 5,775,369 A | 7/1998 | Hagmann | 137/501 |

* cited by examiner

Primary Examiner—Stephen M. Hepperle
(74) Attorney, Agent, or Firm—Thaddius J. Carvis

(57) ABSTRACT

Simple APCV, ADPCV and PICV's are provided. The APCV's are referenced to the atmosphere and control the gauge pressure, either upstream or downstream. The ADPCV's are the same as the APCV's, differing in that they are not referenced to the atmosphere. They are instead referenced to a second point in the fluid flow system and control the differential pressure. The PICV's are control valves connected in series with ADPCV's and control the fluid flow rate through the valve independently of variations in the line pressure. A preferred APCV has a valve body (1) with connections for a single-phase fluid line and a flow passage between the inlet (2) and the outlet (3) of said fluid line, with an opening having a defined seat orifice (7) intersecting the flow passage. A moveable assembly, comprising a disk (5) or cup is connected to a pressure sensing member (4), having essentially the same effective surface area. The moveable assembly, is biased by a force, and is free to automatically move to any intermediate position between fully open and closed, producing a desired outlet pressure which minus the reference pressure, times the effective surface area of the disk or cup generates an opposing force equal to the biasing force.

39 Claims, 23 Drawing Sheets

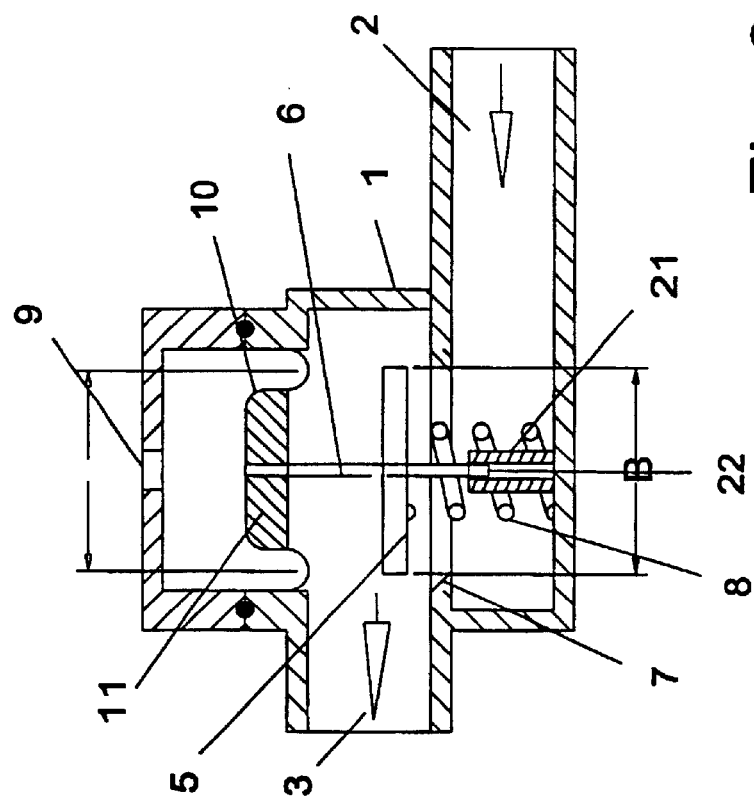
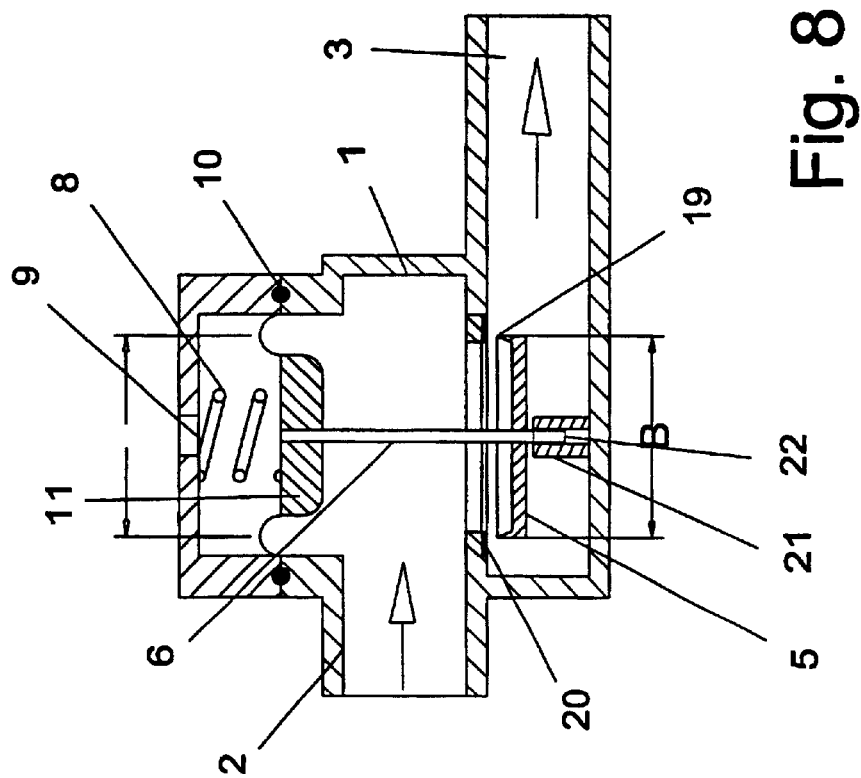

PRESSURE INDEPENDENT CONTROL VALVE

This invention refers to provisional patent application #60/149,399 File date Aug. 17, 1999.

FIELD OF THE INVENTION

The invention is an automatic pressure control valve which can be used for pressure control of a liquid or gas media flow. It can be used to control the gauge pressure, or the differential pressure between two points in a system.

It can control the pressure in for example; compressed air, water or steam lines, oil and fuel supplies and air handling systems. It can also be used to control the liquid level in tanks.

An important application is together with control valves, for automatic flow rate control. The automatic pressure control valve is piped in series with the control valve and arranged so it maintains a constant differential pressure across the control valve. The two valves works together as a pressure independent control valve.

Description of Prior Art

Automatic pressure control valves are used to control liquid or gas media flow so the pressure is essentially constant. A common type of automatic pressure control valve has the controlled media acting against one side of a diaphragm, and the opposite side is connected to the atmosphere. The differential pressure over the surface over the diaphragm produces a force which is opposed by a spring. Typical examples are shown in U.S. Pat. Nos. 4,044,792 and 5,009,245.

Pressure variations causes unbalance between the two forces and produces a net force that moves the diaphragm. The diaphragm operates a valve mechanism, which increases or decreases the pressure of the media until there is balance between the diaphragm and the spring. Thus, the spring tension determines the set-point of the automatic pressure control valve. In the following text the automatic pressure control valve is referred to as APCV.

The diaphragm is connected to the valve mechanism via a stem that passes through a packing or similar. Its friction together with the friction of the valve mechanism must be overcome by the net force from the diaphragm and spring.

In order to get a smooth control, with only a small hysteresis, the diaphragm and spring need to be relatively large so already a very small pressure variation produces a net force strong enough to overcome the friction.

This is not the only reason for using a large diaphragm. The control surface of the valve mechanism has an area against which the media pressure acts and produces a force. This force typically counteracts the spring force. Therefore, variations in the media pressure will change the set-point. This is especially true if the control mechanism must have a large flow capacity.

When a large flow capacity is needed, the control surface must be large, and the force counteracting the spring is quite large. Therefore the diaphragm and spring need to be large so the influence of the media pressure on the set-point will not be too large.

Instead of increasing the area of the control surface its movement can be increased. This will also increase the flow capacity. The drawback is that the movement changes the spring tension, which also changes the set-point. The change depends upon how much the control surface needs to open, which is a function based upon both the flow and the pressure.

The change in set-point is reduced by using a long spring, so the movement is small compared to the length of the spring. However, this increases the size and cost of the APCV.

The above described APCV balances the controlled pressure against the atmosphere and a spring. Many other types of valves exists. For example, instead of connecting to the atmosphere, both sides of the diaphragm are connected to the media, but to different points of the system. A built in spring acts against the diaphragm and the valve mechanism regulates the media flow so a controlled differential pressure is maintained between the two points. This is an automatic differential pressure control valve. In the following text referred to as ADPCV.

From the above it is understood that in order to achieve a good accuracy APCVs ADPCV's need large diaphragms and springs. This of course means that also the housing surrounding the diaphragm need to be quite large and costly.

There are some valve mechanisms that have not the above described problems. However, many of these valves (sleeve type, for example) tend to leak, so the very small flows can not be controlled.

It is also possible to use pilot valves to operate the diaphragm to improve the accuracy. However, this an added complication which increases the cost.

The above is a brief summary of the some of the problem associated with APCVs.

Automatic control valves in HVAC and industrial process applications are fitted with actuators that operates the control valves in response to signals from controllers, so the correct flow is provided. The problem is that the flow not only depends upon how much the valves are open, but also upon the differential pressure across the valve.

The differential pressure depends upon the operating conditions of the whole piping system.

A sudden pressure variation in the piping system changes the flow through a control valve and the control is upset. It takes some time before the control system signals the actuator to change the opening of the valve so the correct flow is obtained and stable control is restored.

Control valves are made with a certain flow characteristics, which defines how the flow changes as the valve opens.

The flow characteristics is designed with a curvature that compensates for the non-linear characteristics of the control object (often heat transfer devices). The objective is that the total characteristics is linear, from the signal to the actuator to the output of the control object. This is very beneficial for stable control.

The flow characteristics of a valve is laboratory tested at a constant differential pressure.

Pressure variations due to load changes distorts the flow characteristics of the control valves, which is detrimental for stable control.

It is very difficult to correctly size control valves. The flow coefficient needs to be calculated. It is calculated by multiplying the flow rate (GPM) by the square root of the specific gravity of the liquid and then divide by the square root of the differential pressure at the maximum load conditions. Unfortunately, it is very difficult to obtain a correct information about the differential pressure that reflects the actual conditions. One of the reasons is that the "as built conditions" deviate form the specification.

Without correct information, the control valves will not be sized correctly. Undersized control valves can not supply the needed flow and must be replaced. To avoid this the tendency is to install oversized control valves. However, it is very detrimental for stable control, especially at low loads.

The problem can be solved by combining the control valve with an ADPCV, and arrange it so it maintains a constant differential pressure across the control valve.

With a constant differential pressure across the control valve a well defined flow rate is provided for each degree of opening of the control valve. The flow rate is independent of pressure variations in the piping system before and after the valve combination. Therefore, the combination of an ADPCV and a control valve is referred to as a PRESSURE INDEPENDENT CONTROL VALVE (in the following text called PICV).

Because of the constant differential pressure the control valve will always operate with a perfect valve authority and therefore the flow characteristics will not be distorted by pressure variations in the piping system.

The PICV can be applied in different ways.

It can be used as an automatic flow rate controller, with a manually adjusted set-point, and can have a handle and a graduated indicator disk to adjust the flow rate. Applications are where a constant, or manually adjusted flow rate is needed. It can also be used as a high limit in applications with a variable flow The PICV can be operated by an actuator, which responds to signals from a controller.

The maximum flow through the PICV can be set by limiting the maximum opening of the control valve. This can be done by limiting the stroke of the actuator.

The PICV can provide significant improvement of the quality of control in an industrial process or in a HVAC control system. The problem so far has been the high cost.

It is primarily the ADPCV that increases the cost. The reason is the relatively large diaphragm, spring and housing. Typical examples of PICV's are shown in U.S. Pat. Nos. 5,143,116 and 5,775,369.

SUMMARY OF THE INVENTION

The invention is a simple APCV, ADPCV and PICV.

The APCV are referenced to the atmosphere and controls the gauge pressure. There are two types.

The first type of APCV controls the downstream pressure.

The second type of APCV controls the upstream pressure.

APCV's for general pressure control applications are shown.

Special APCV's for level control in tanks are also shown.

The ADPCV's are the same as the APCV's, the difference is that they are not referenced to the atmosphere. They are instead referenced to a second point in the fluid flow system and controls the differential pressure.

The PICV's are control valves connected in series with ADPCV's and controls the fluid flow rate through the valve independently of variations in the line pressure.

The first type of APCV has a body with a passage way for a fluid flow between an inlet and an outlet. Intersecting the passage way is a seat, against which a control disk operates and regulates the flow. The control disk is on the downstream side of the seat and controls the outlet pressure. On the upstream side of the seat there is a diaphragm from which the control disk is suspended by a stem. The effective surface area of the diaphragm and the control disk are the same, so the two are balanced. Instead of a diaphragm, a piston, disk bellow or any other suitable pressure sensing device can be used.

The incoming pressure acts upon the underside of the diaphragm and the top side of the control disk. The forces are equal and acts in opposite directions so they neutralize each other.

The cross section area of the connecting stem is not important for the balance of forces, because it affects the bottom side of the diaphragm and the top side of the control disk equally.

The only difference is that a stem with a large cross section area results in a smaller opposing forces than a small diameter stem. Either way the opposing forces are equal and neutralize each other.

The pressure differential between the top side of the diaphragm and the bottom side of the control disk, acts over the effective area and produces a force. Under normal conditions, the pressure above the diaphragm is less than the pressure under the control disk. Thereby, the net force is directed upward and strives to move the control disk up against the seat. A spring provides an opposing force and pushes against the top of the diaphragm.

If the outlet pressure for any reason increases, the control disk moves towards the seat and reduces the annular opening between the two. This increases the flow resistance and which reduces the pressure under the control disk. Automatically, the control disk moves and adjusts the annular opening so the outlet pressure assumes a value that produces a balance of forces.

The spring tension determines the set-point for the pressure (Instead of a spring or in combination with, an air pressure can be used, or weight, or magnet, proportional solenoid, or similar.)

When the top side of the diaphragm is connected (referenced) to the atmosphere the APCV will control a gauge pressure. The spring tension divided by the effective area equals the set-point.

In the following text the "effective area" refer to the side of the pressure sensing member facing the reference pressure, or the side of the disk or cup facing the controlled pressure.

The second type of APCV is similar to the first type, with the following exceptions.

The control disk is on the downstream side of the seat and controls the inlet pressure. On the downstream side of the seat there is a diaphragm to which the control disk is connected by a stem.

The outlet pressure acts upon the underside of the diaphragm and the top side of the control disk. The forces are equal and acts in opposite directions so they neutralize each other.

The pressure differential between the top side of the diaphragm and the bottom side of the control disk, acts over the effective area and produces a force. Under normal conditions, the pressure above the diaphragm is higher than the pressure under the control disk. Thereby, the net force is directed downward and strives to move the control disk down against the seat. A spring under the control disk, opposes the force. (In the case where the pressure above the diaphragm is less than the pressure under the control disk, the spring instead can be located above the diaphragm against which it pushes down.)

The control disk moves down against the seat if the inlet pressure increases. This increases the flow resistance and the pressure under the control disk. It automatically finds the position that produces the inlet pressure that produces a force that balances the pressure above the diaphragm minus (or plus) the spring force.

The spring tension determines the set-point for the pressure. (Instead of a spring or in combination with, an air pressure can be used, or weight, or magnet, proportional solenoid, or similar.)

When the top side of the diaphragm is connected (referenced) to the atmosphere the APCV will control a gauge pressure.

When the top side of the diaphragm is connected to second point in a system, the ADPCV will control a differential pressure between the outlet of the automatic pressure control valve and the second point. The second point should be downstream of the ADPCV.

It is very important that the effective areas of the disk and the diaphragm are essentially the same. Otherwise, the pressure will not be controlled at a stable value.

If the effective areas are different, APCV's controlling the outlet pressure will be affected by the inlet pressure, and APCV's controlling the inlet pressure will be affected by the outlet pressure.

In order to get a well defined effective area of the disk, its perimeter should have a pointed edge which makes contact with the seat at a specific diameter. The pointed edge is also needed to get a high contact pressure against the seat, so a tight close-off can be accomplished. It is also advantageous if the seat is conical so the disk will self-center.

To maintain the same pressure across the surface of the top of the disk, the diameter of the disk should be only slightly larger than the inlet opening of the conical seat. Otherwise the pressure near the perimeter of the disk may drop at higher flow rates. The force balance will be changed and the controlled pressure will drop noticeably at high flow rates.

The PICV's are control valves connected in series with ADPCV's, which are arranged to control the differential pressure across the control valve. Thereby, fluid flow rate through the valve is determined only by the degree of opening of the control valve, and is independent of variations in the line pressure.

The differential pressure is picked up from the second point and can be communicated to the diaphragm of the ADPCV via an external pipe. However, when the ADPCV and control valve are one unit, it is advantageous to use an internal connection.

When a PICV uses the same body for the control valve and the ADPCV, a channel can be made inside the body to communicate the differential pressure of the control valve to the diaphragm of the ADPCV.

If the control valve (of the PICV) is a globe valve, curtain or a top entry ball valve, the main body can be in one piece. The differential pressure is then connected from just after the control valve, and it is relatively easy to make the channel.

If the control valve is a "two piece" ball valve, having a main body and a nipple, the differential pressure should not be connected from the nipple, because it is impractical to line up a channel from the nipple to the main body. Instead, the ball should have a small hole from the bore through the ball, to the cavity surrounding the ball. The cavity is connected via a channel to the diaphragm of the ADPCV. Thus, the pressure inside the ball is communicated to the diaphragm. An added advantage is that when the ball is in the closed position, communication between the diaphragm and the outlet of the PICV is closed. When servicing the APCV only a upstream shut-off valve needs to be closed.

The internal parts (diaphragm with its chamber and spring, shaft, seat and disk) of the APCV or ADPCV can be built as one unit, in the form of an insert. The insert fits into a special recess in the body. This simplifies service and replacement of the APCV.

In all the following figures, the effective area of the diaphragm is essentially the same as the effective area of the control disk.

Figure 2:
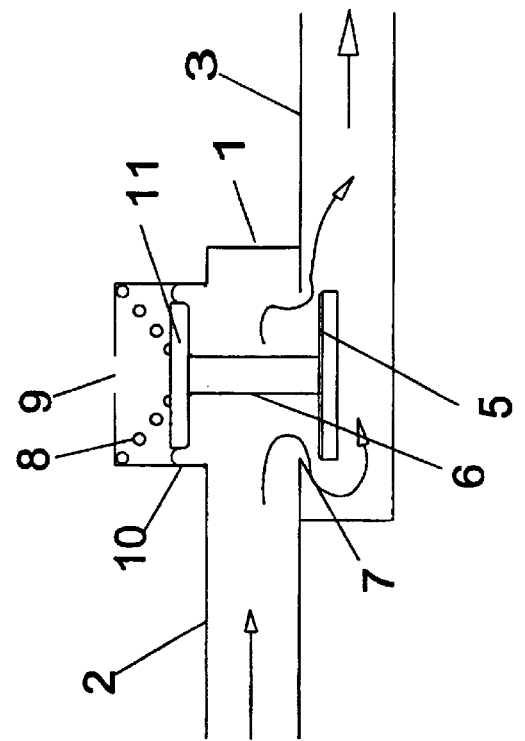

FIG. 2 shows a simplified schematic presentation of an APCV using a diaphragm. It is spring biased, and the control disk has a chamfered surface operating against the seat. The downstream pressure is controlled.

Figure 3:
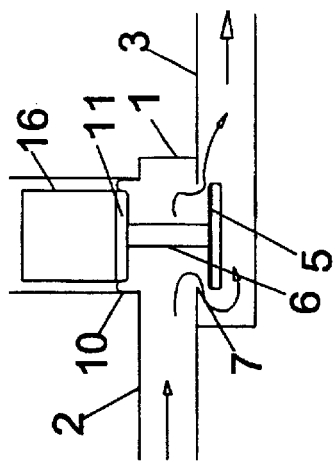

FIG. 3 is similar to FIG. 2 except the spring is replaced by a regulated air pressure.

Figure 4:
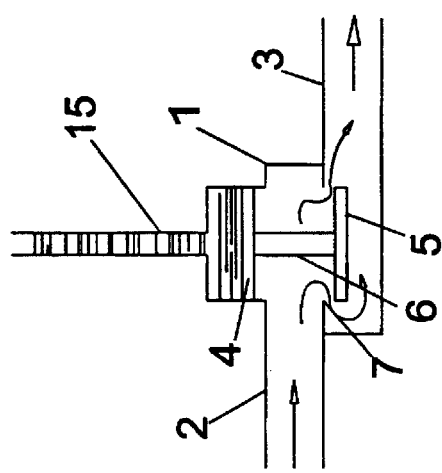

FIG. 4 is similar to FIG. 2 except the spring is replaced by a column of a liquid.

Figure 5:
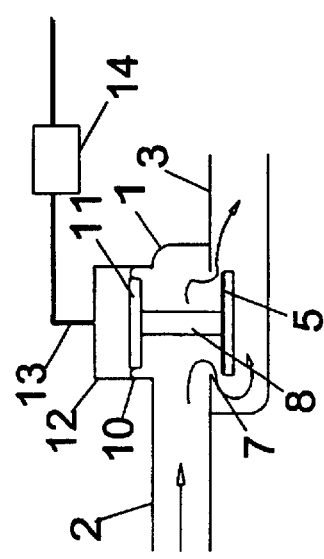

FIG. 5 is similar to FIG. 2 except the spring is replaced by a weight.

Figure 6:
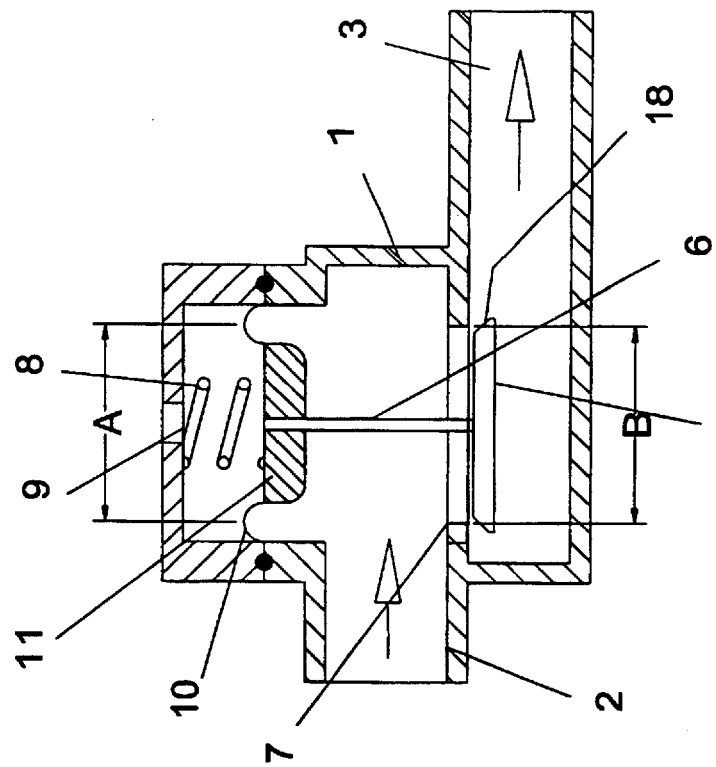

FIG. 6 is similar to FIG. 2 except the control disk has a pointed edge facing the seat which has a chamfered (conical) surface.

Figure 7:
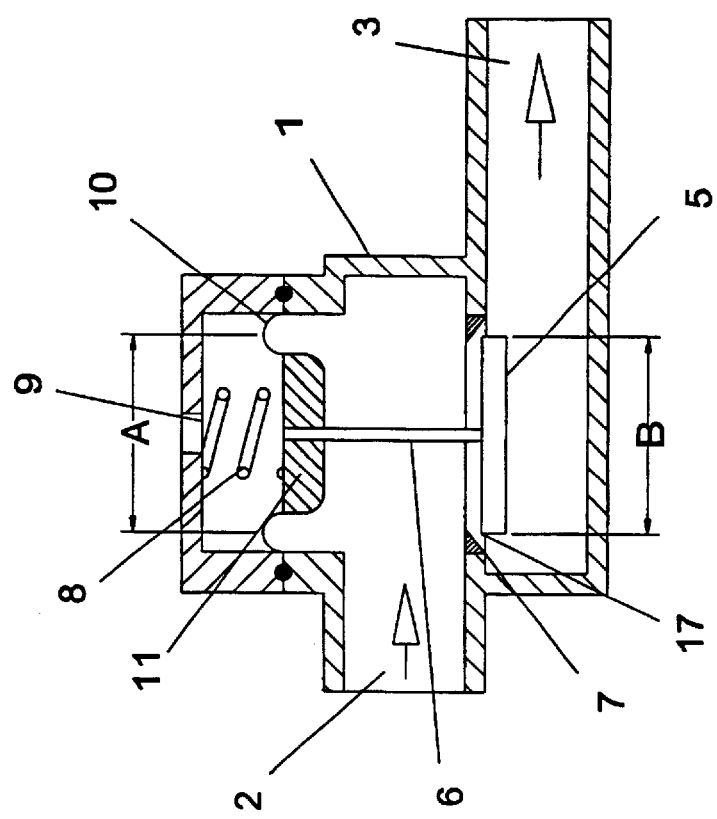

FIG. 7 is similar to FIG. 6 except the control disk has a chamfered surface facing the seat which has a pointed edge.

FIG. 8 is similar to FIG. 7 except the control disk has a rim with a pointed edge facing the surface just under the seat. The surface under the seat may be flat or chamfered. The lower part of the control disk has an optional guide pin, which slides inside a support bushing.

FIG. 9 has the control disk located above the seat. The flow direction is reversed compared to FIGS. 1–8. The upstream pressure is controlled and over the control disk produces a force that together with the spring is balanced by the force produced by the (higher) pressure above the diaphragm. The lower part of the control disk has an optional guide pin, which slides inside a support bushing. (If the pressure above the diaphragm the low, the spring instead is located above the diaphragm and pushes down.)

Figure 10:
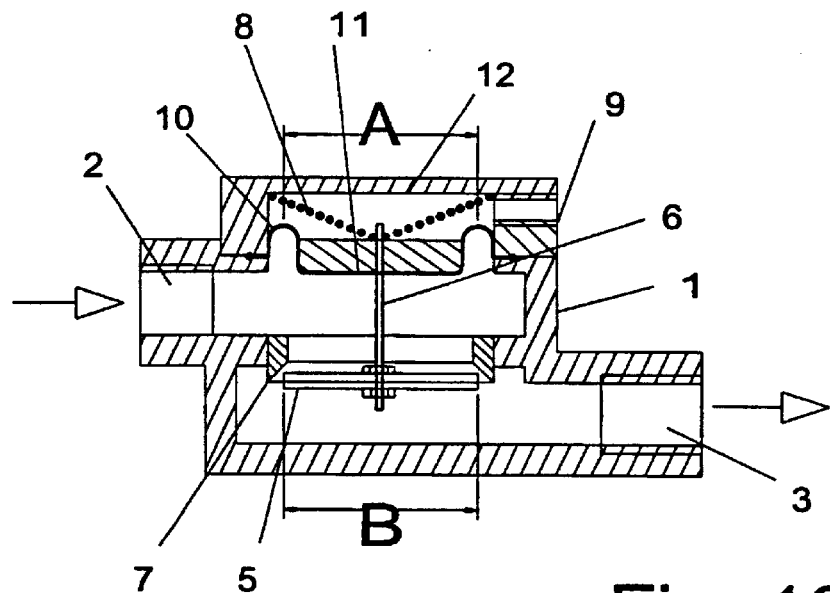

FIG. 10 is the same as FIG. 6, but more detailed. A conical spring is used.

Figure 11:
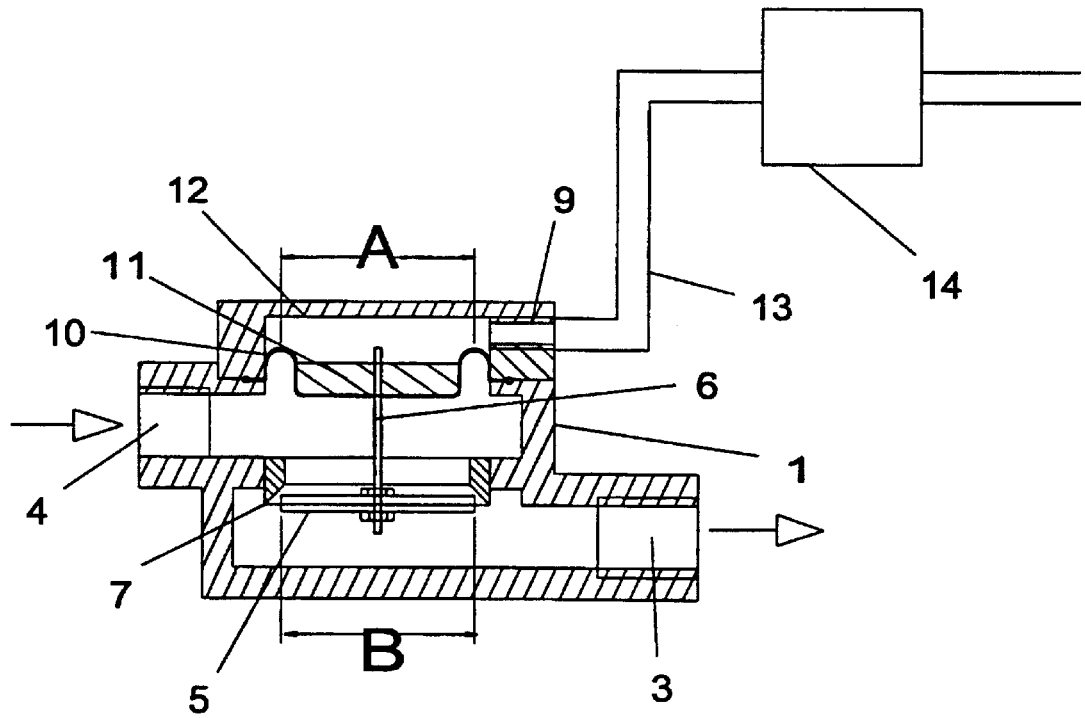

FIG. 11 is similar to FIG. 3, but with more detail.

Figure 12:
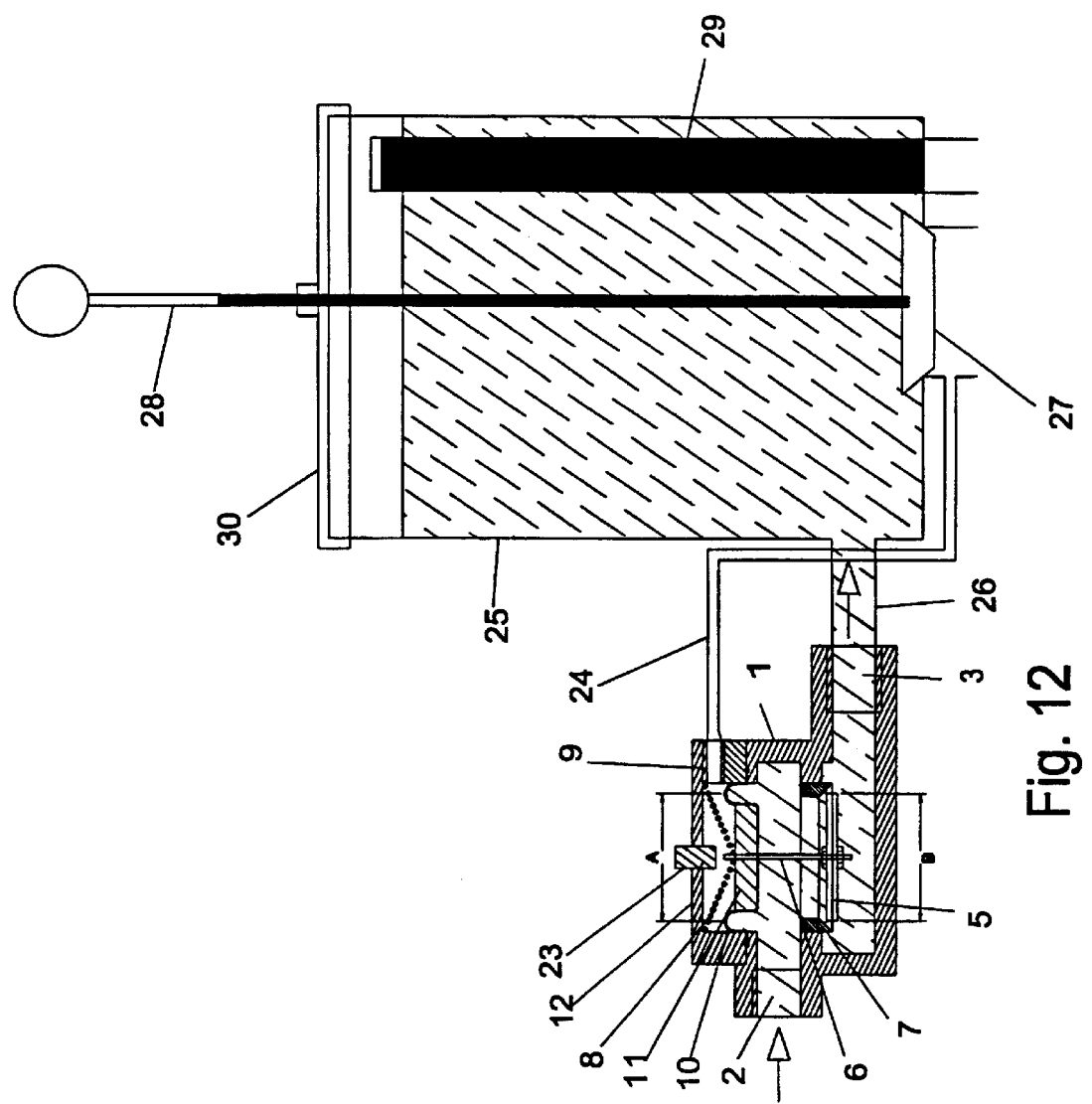

FIG. 12 shows an APCV applied to control the water level in a tank. A magnet is added to provide a positive shut-off.

Figure 13:
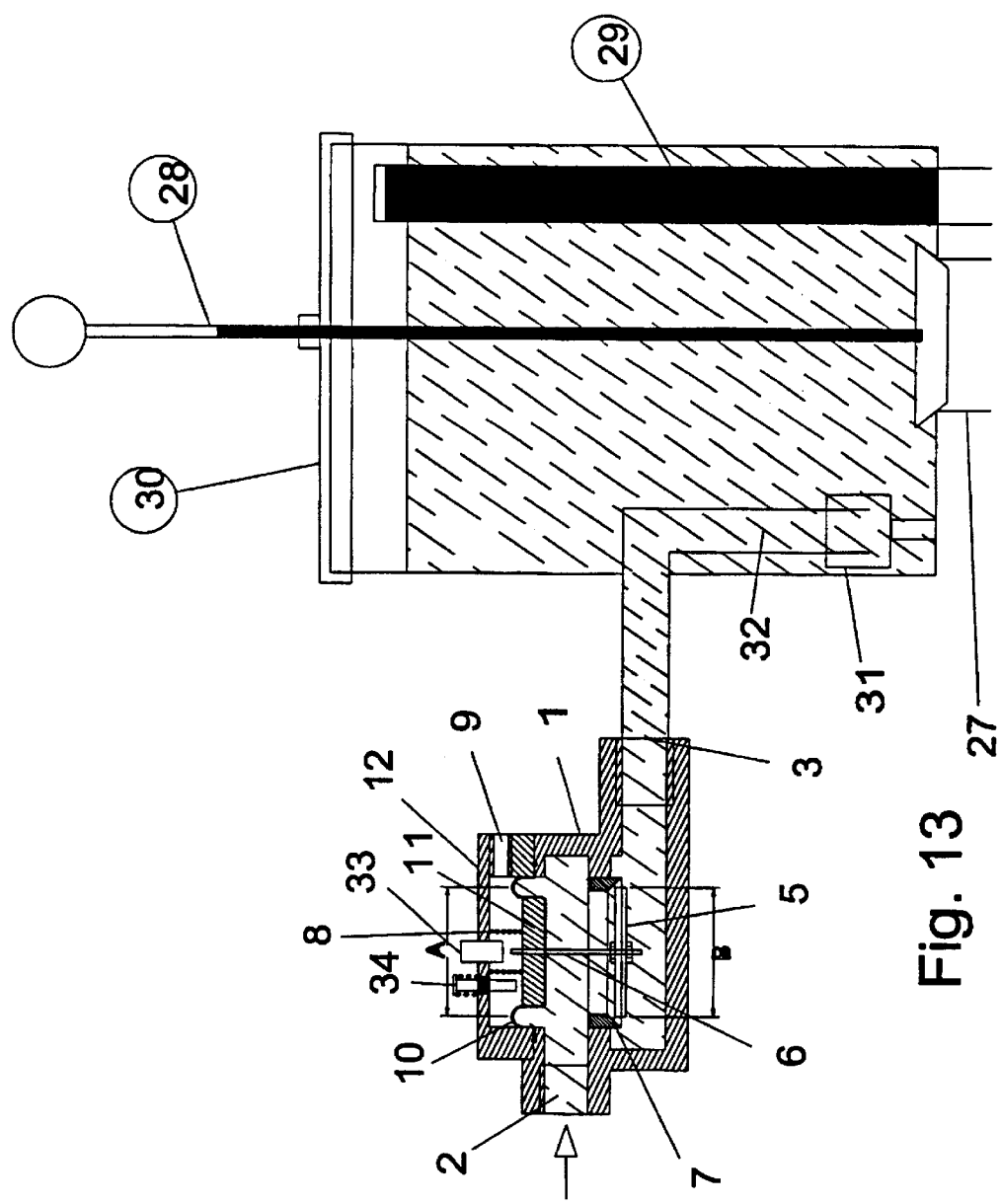

FIG. 13 is similar to FIG. 12 but connected via a suction line to the tank. A push button is added to temporarily open the valve to purge air from the suction line.

Figure 14:
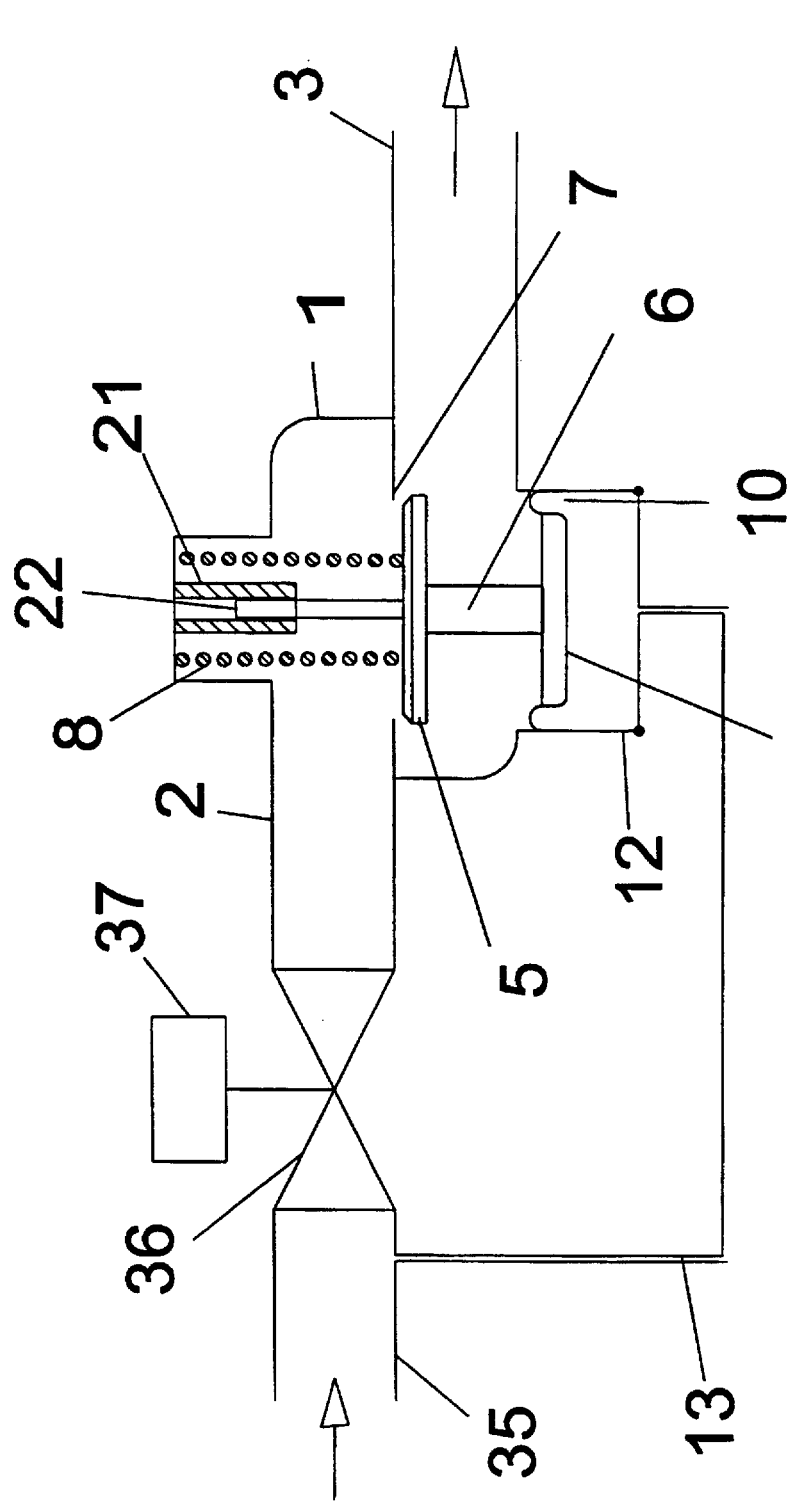

FIG. 14 shows a simplified schematic presentation of a PICV, which comprises a control valve connected in series with an ADPCV. The ADPCV is downstream of the control valve and maintains a constant differential pressure across the control valve.

Figure 15:
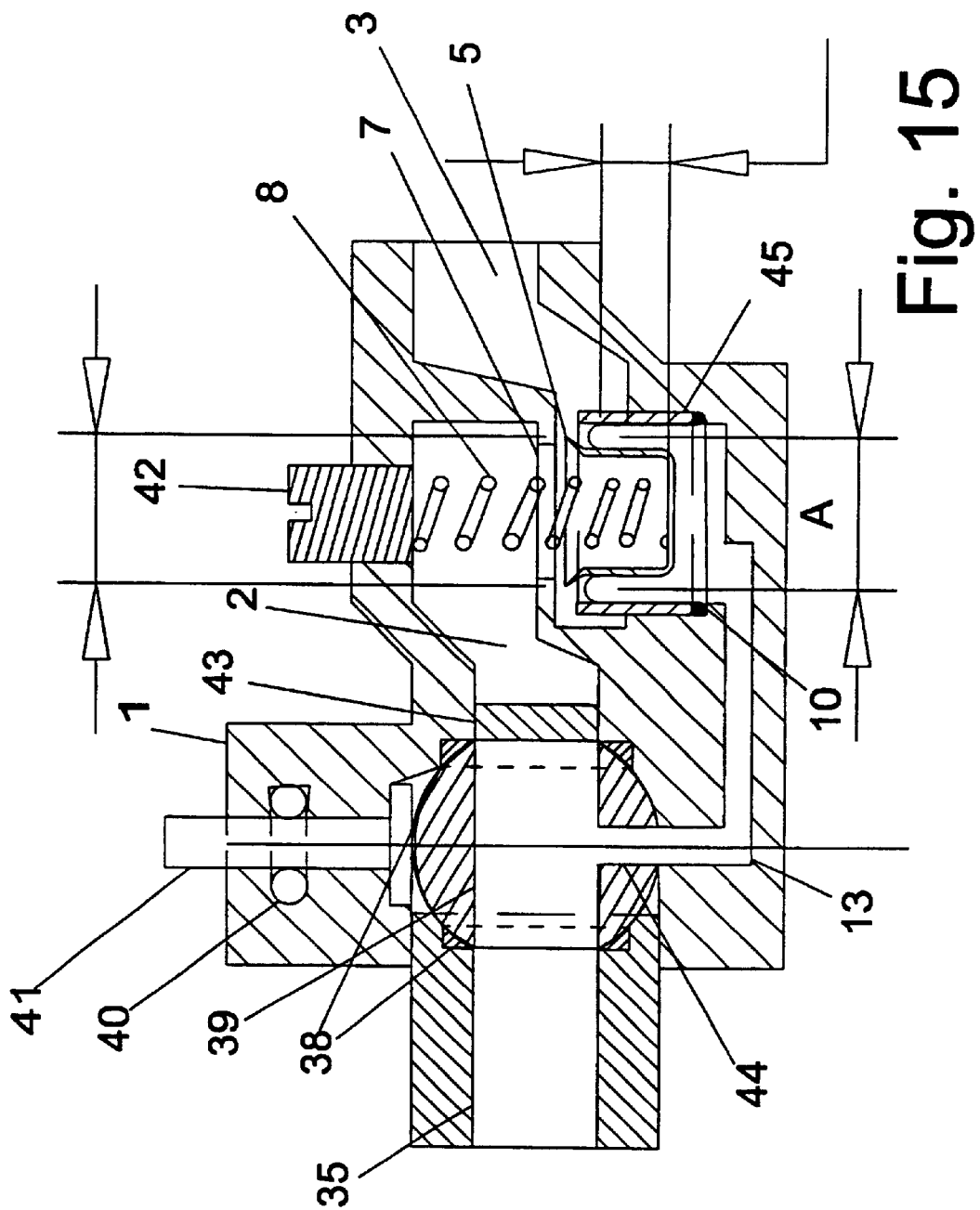

FIG. 15 is the same as FIG. 14 but more detailed. A ball valve is used as a control valve and the control disk is shaped as a cup, with its open side acting towards the seat.

Figure 16:
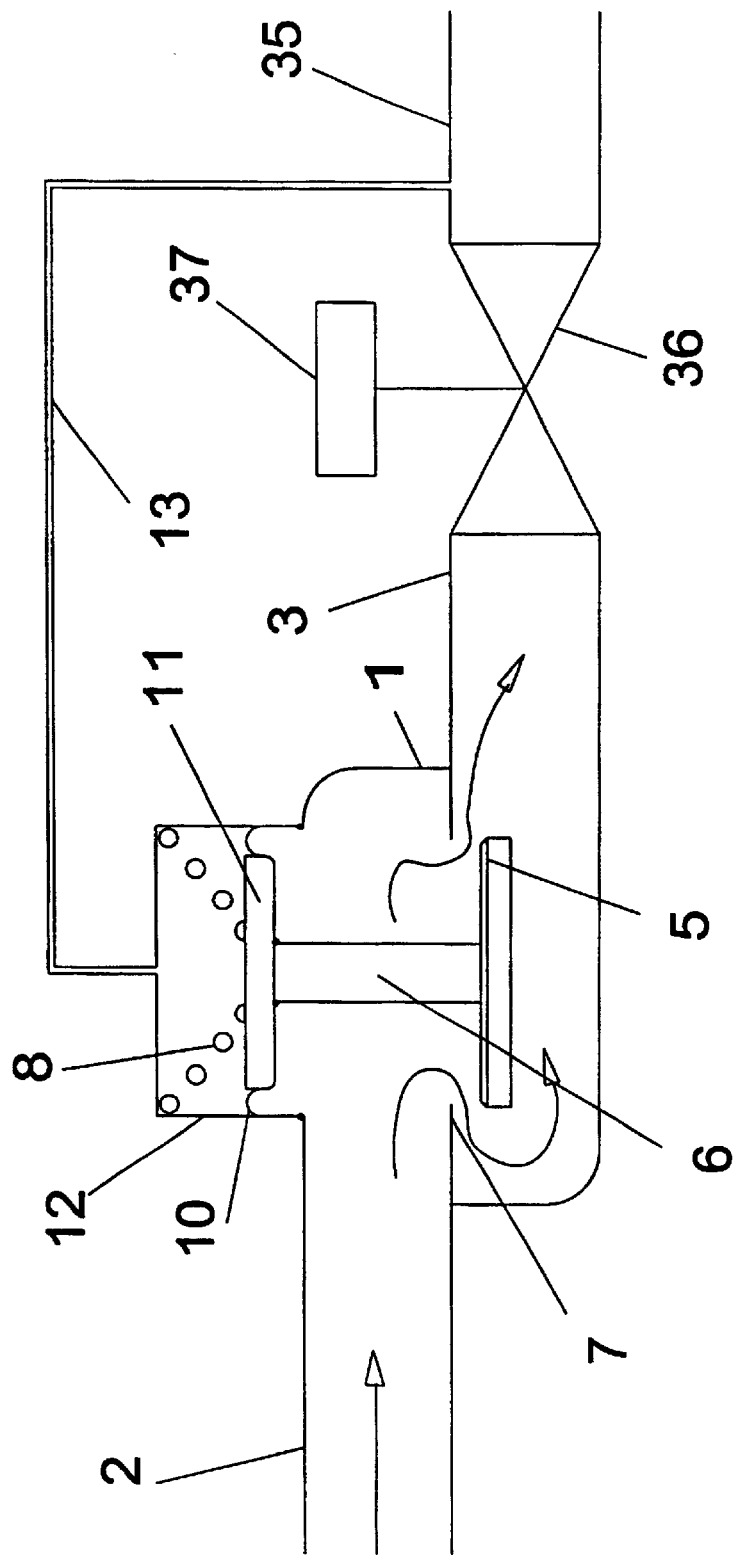

FIG. 16 shows a simplified schematic presentation of a PICV, which comprises a control valve connected in series with an ADPCV. The ADPCV is upstream of the control valve and maintains a constant differential pressure across the control valve.

Figure 17:
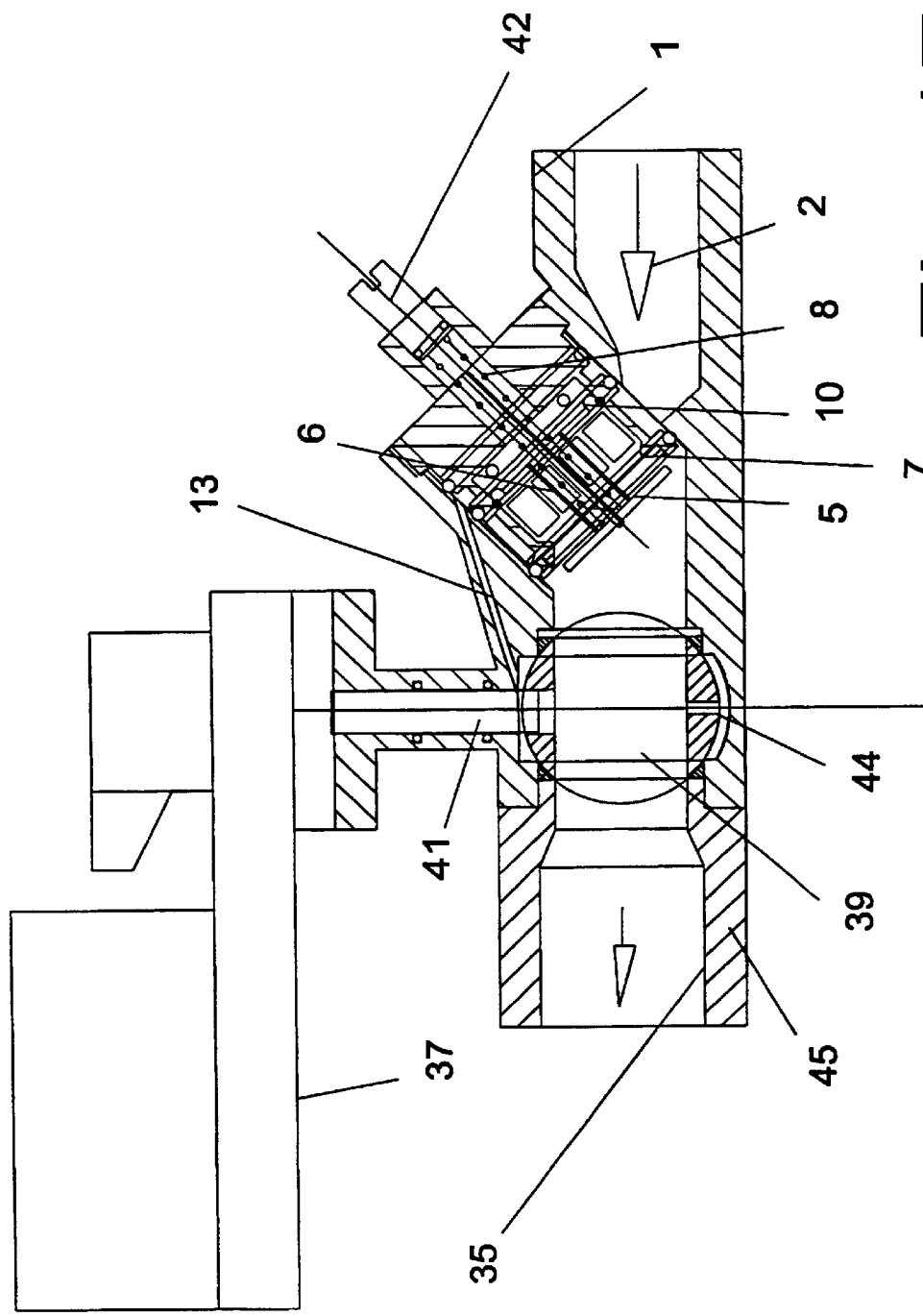

FIG. 17 is the same as FIG. 14 but more detailed. A ball valve is used as a control valve and is shown together with an actuator. The different parts of the ADPCV constitute one detachable unit in the form of an insert, which installs in a recess in the main valve body. The valve body has two parts. The main body and a nipple. The differential pressure is communicated to the diaphragm by a channel inside the main body.

Figure 18:
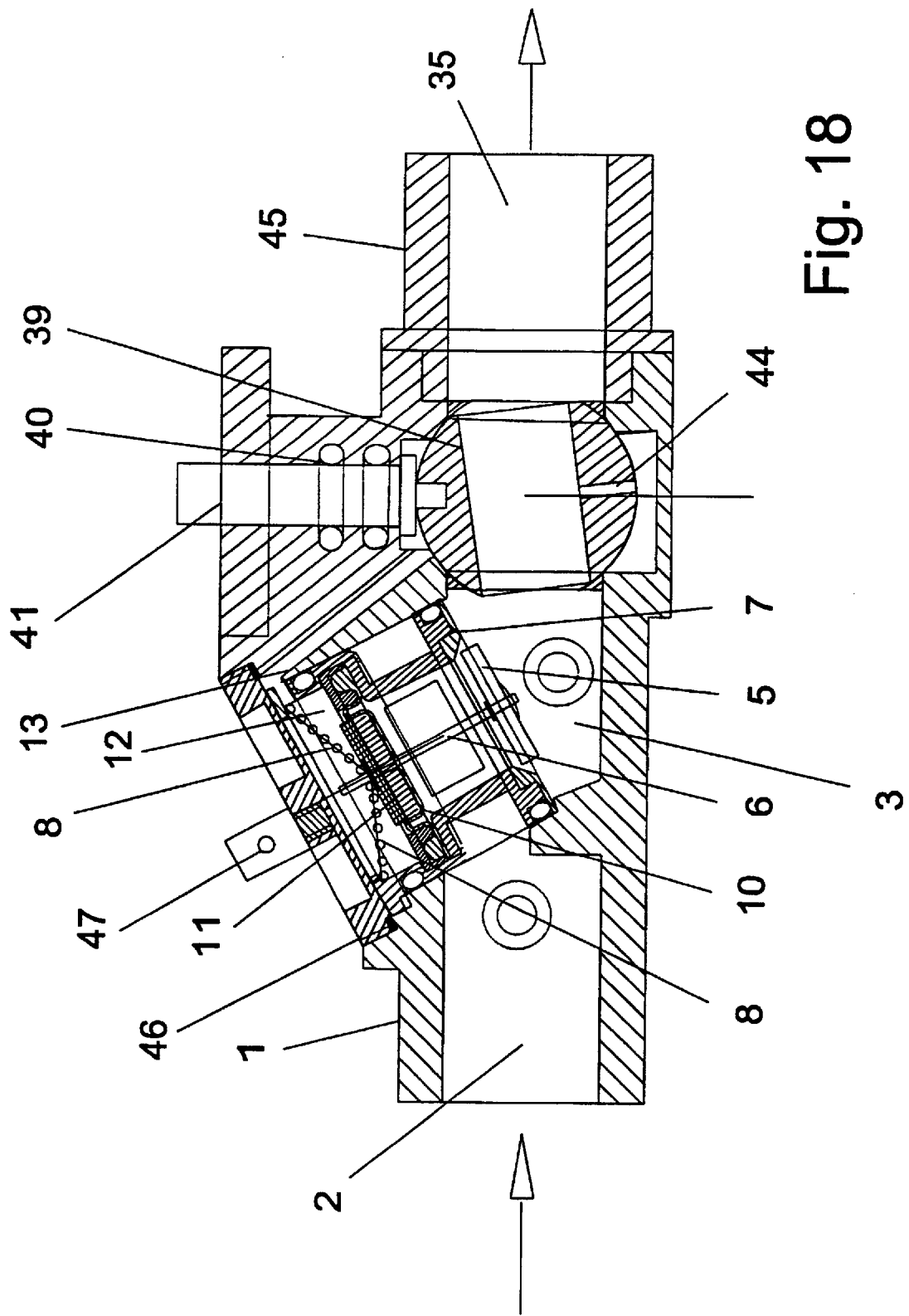

FIG. 18 is similar to FIG. 17, except that the ball of the control valve is cantered and a conical spring is used and an air-vent is added.

Figure 19:
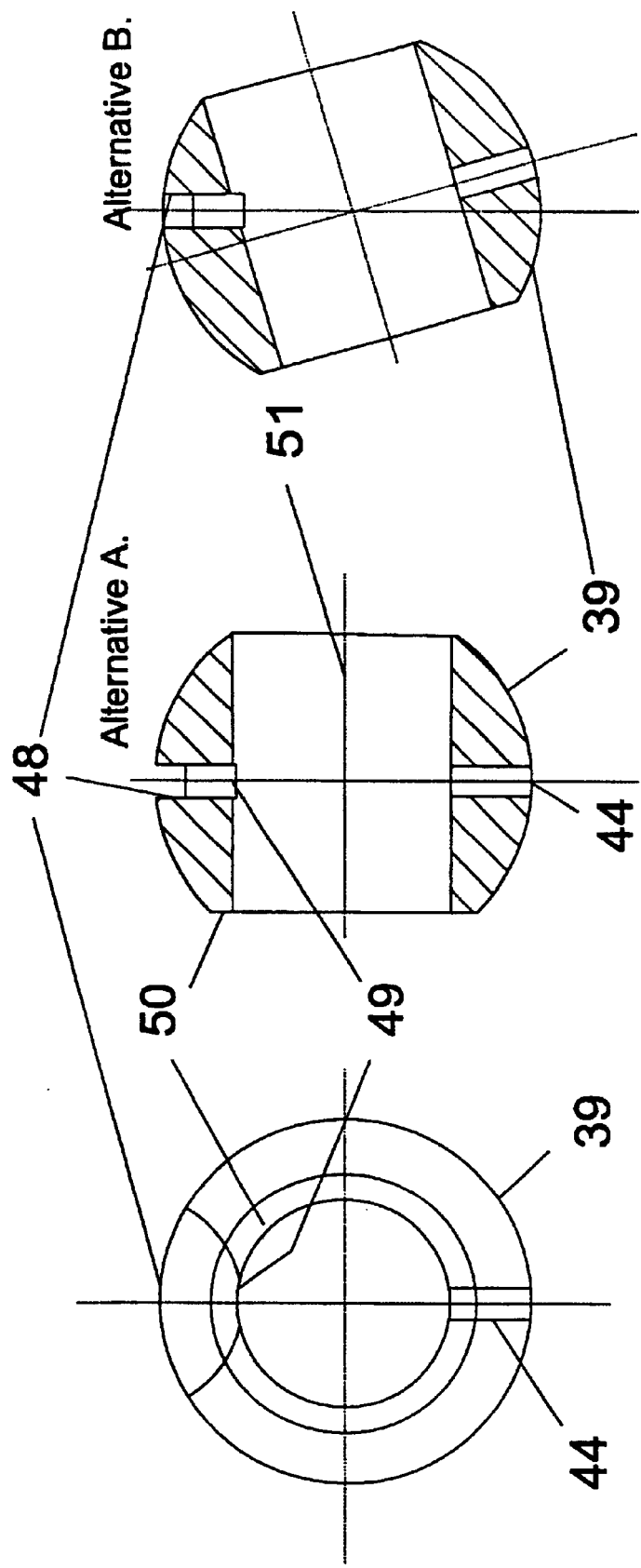

FIG. 19 shows a detailed example of the ball in FIG. 18.

Figure 20:
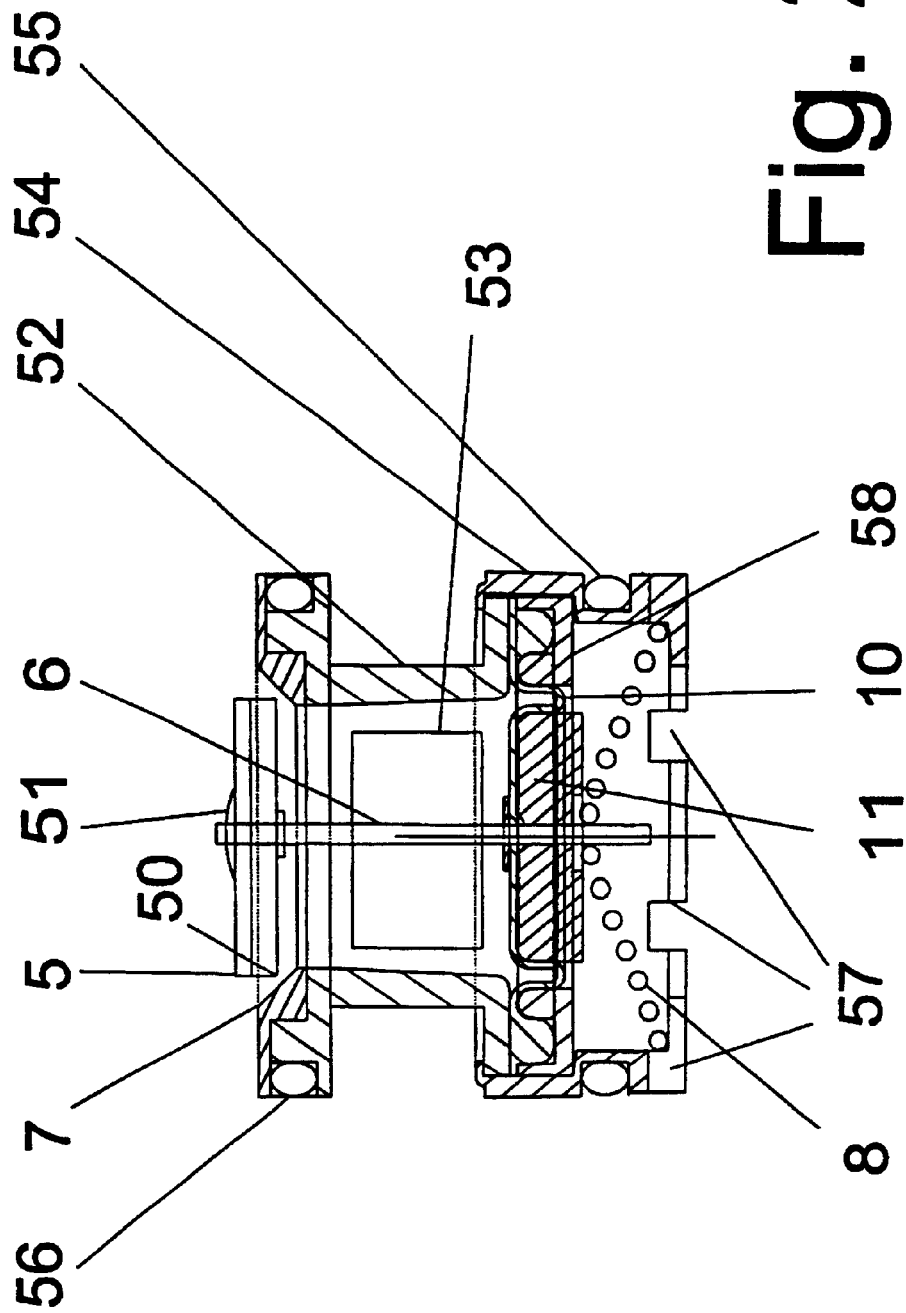

FIG. 20 shows a detailed example of the insert shown in FIG. 18.

Figure 21:
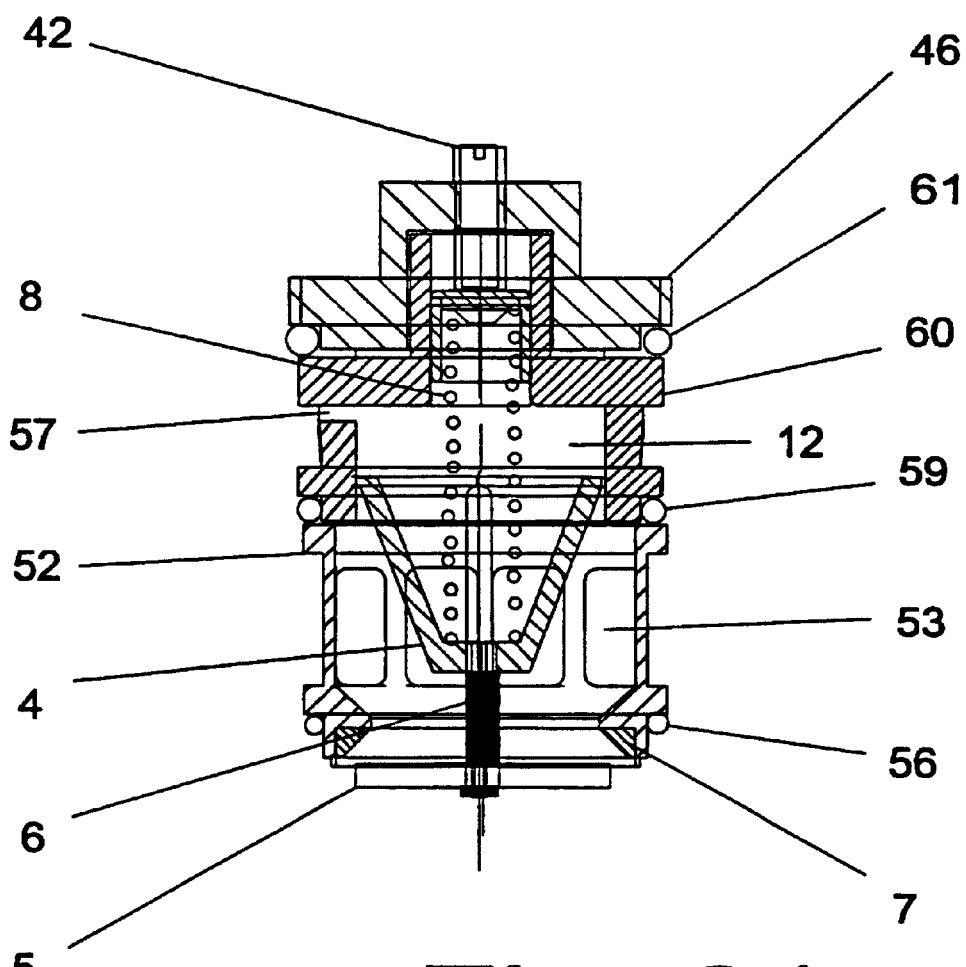

FIG. 21 shows a detailed example of an insert. This insert uses a cylinder and piston instead of a diaphragm.

Figure 22:
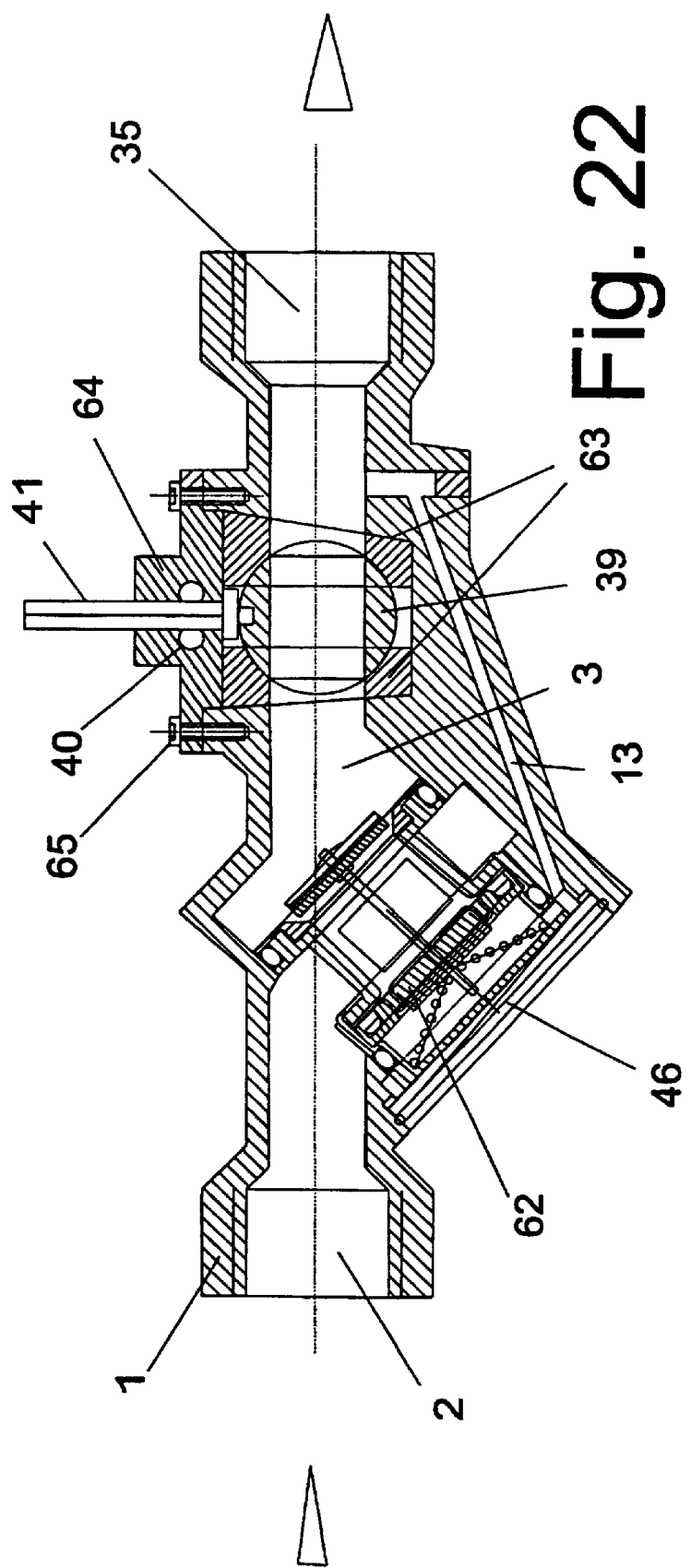

FIG. 22 is similar to FIGS. 17 and 18, except that the control valve is a "top entry" ball valve. Therefore, the valve body is made as one unit, and the pressure channel connects the diaphragm to the downstream side of the control valve.

Figure 23:
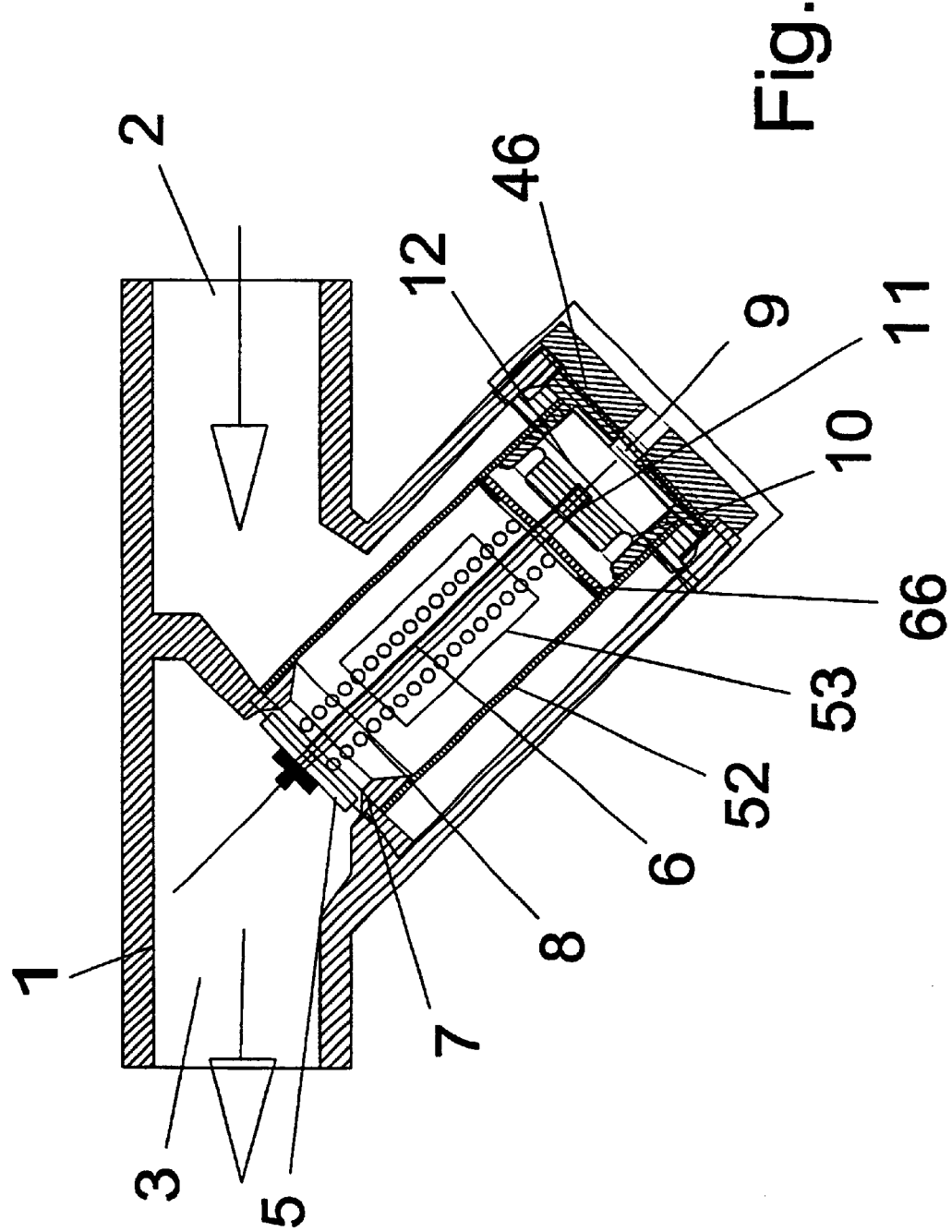

FIG. 23 shows an APCV with an Y-shaped body. The APCV mechanism is built as an insert.

Figure 24:
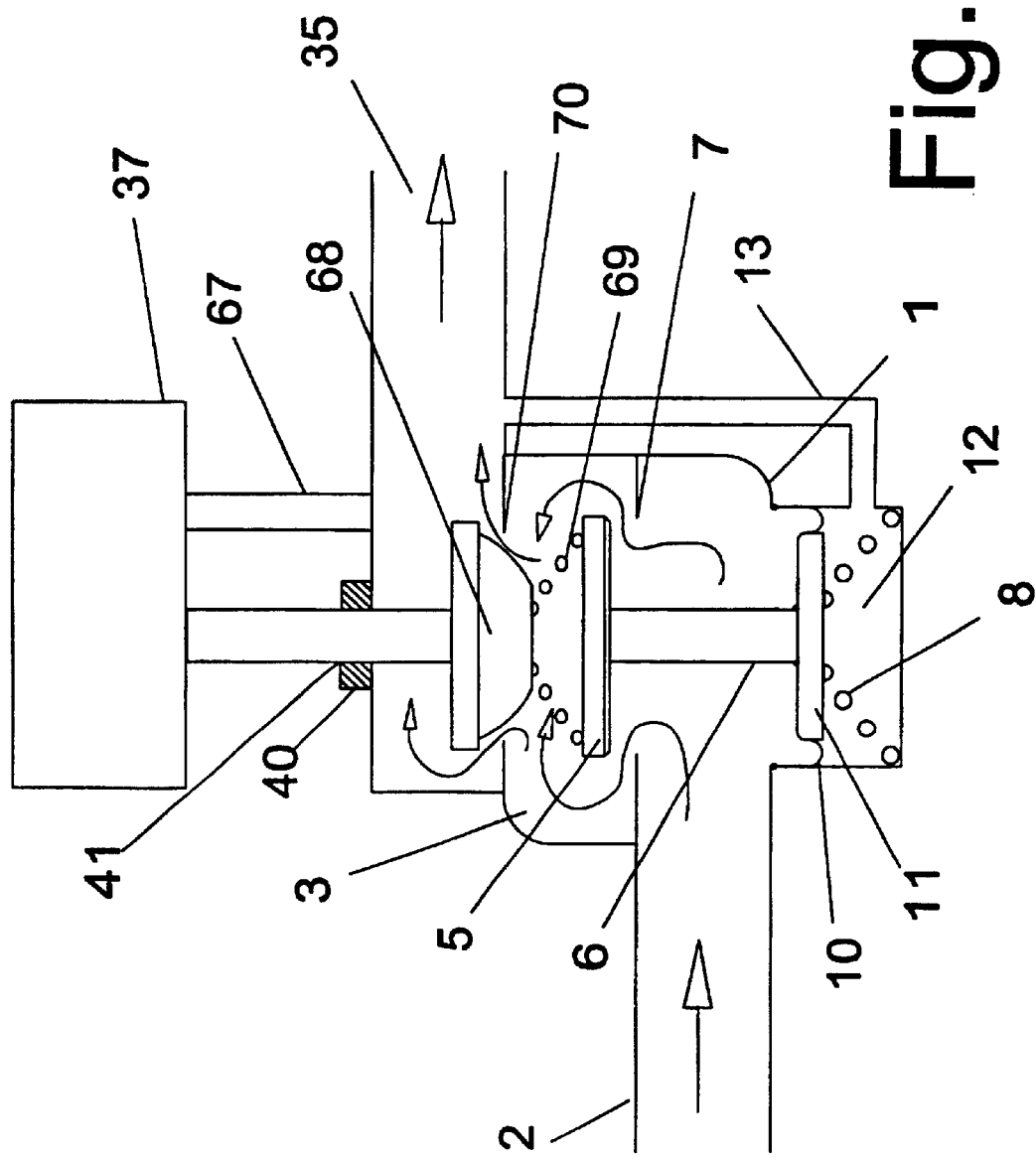

FIG. 24 shows a simplified schematic presentation of a PICV. The control valve is a globe valve. The diaphragm of the ADPCV is via a channel connected to the downstream side of the control valve. A spring is located between the plug of the globe valve and the control disk of the ADPCV. The tension of this spring depends upon the position of the plug, and determines the set-point of the ADPCV.

Figure 25:
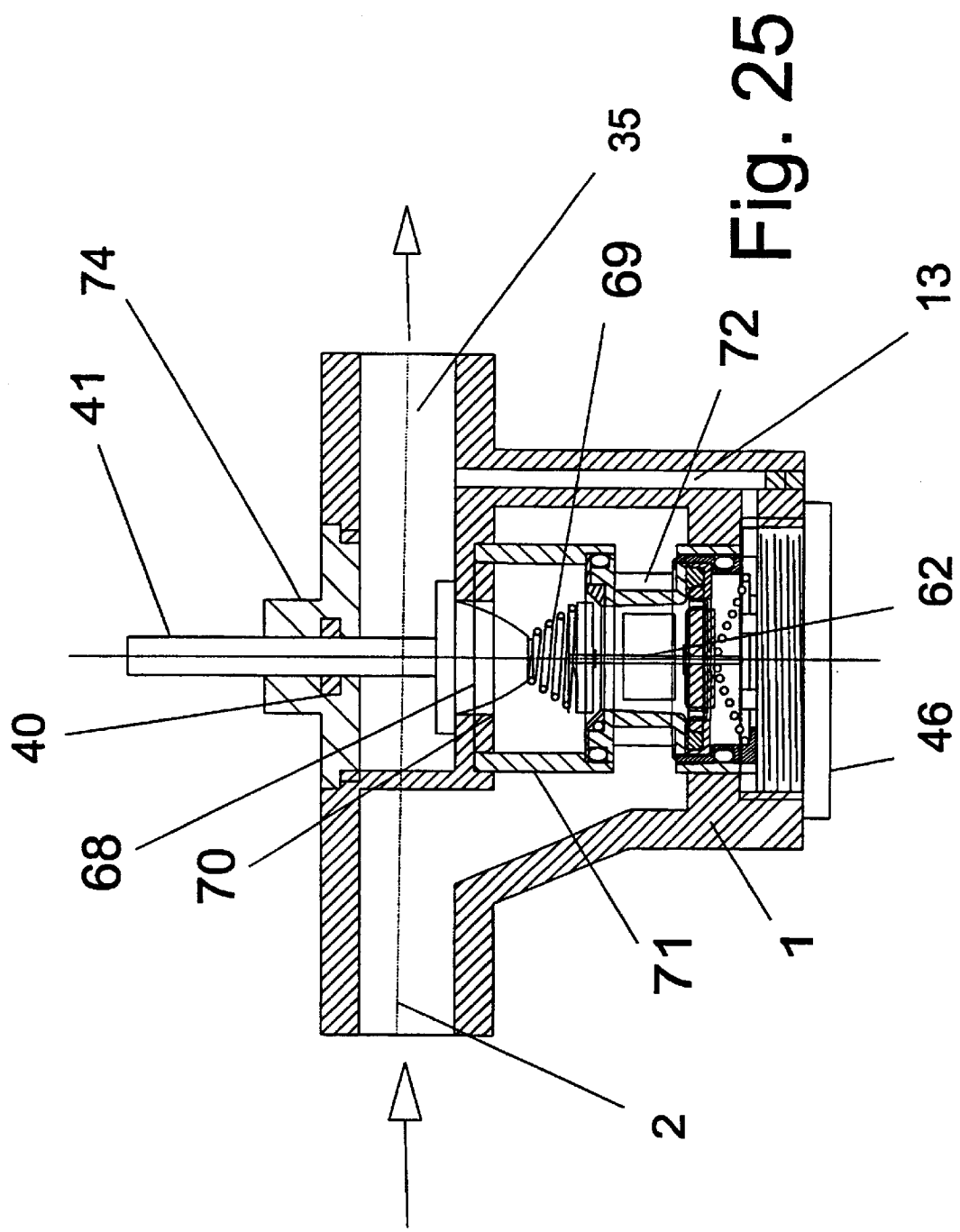

FIG. 25 is similar to FIG. 24, but with greater detail. The ADPCV is in the form of an insert.

Figure 26:
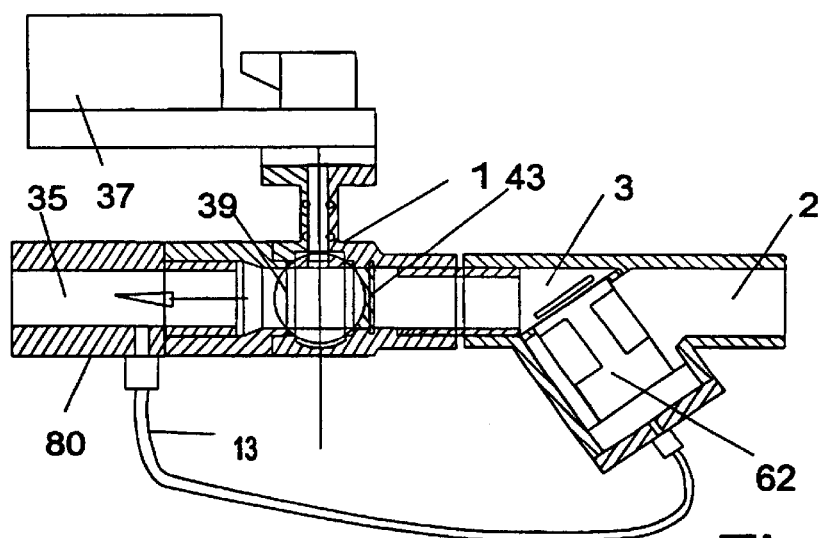

FIG. 26 shows a PICV with the APCV of FIG. 23 used as an ADPCV and piped together with a control valve. The diaphragm is via an external pipe connected to the downstream side of the control valve.

Figure 27:
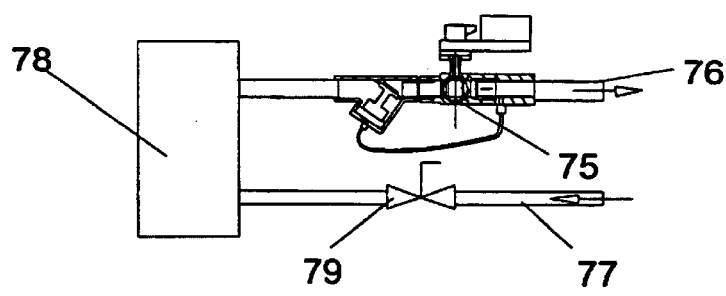

FIG. 27 shows a the PICV of FIG. 26 applied to control the flow through a heat transfer device.

Figure 28:
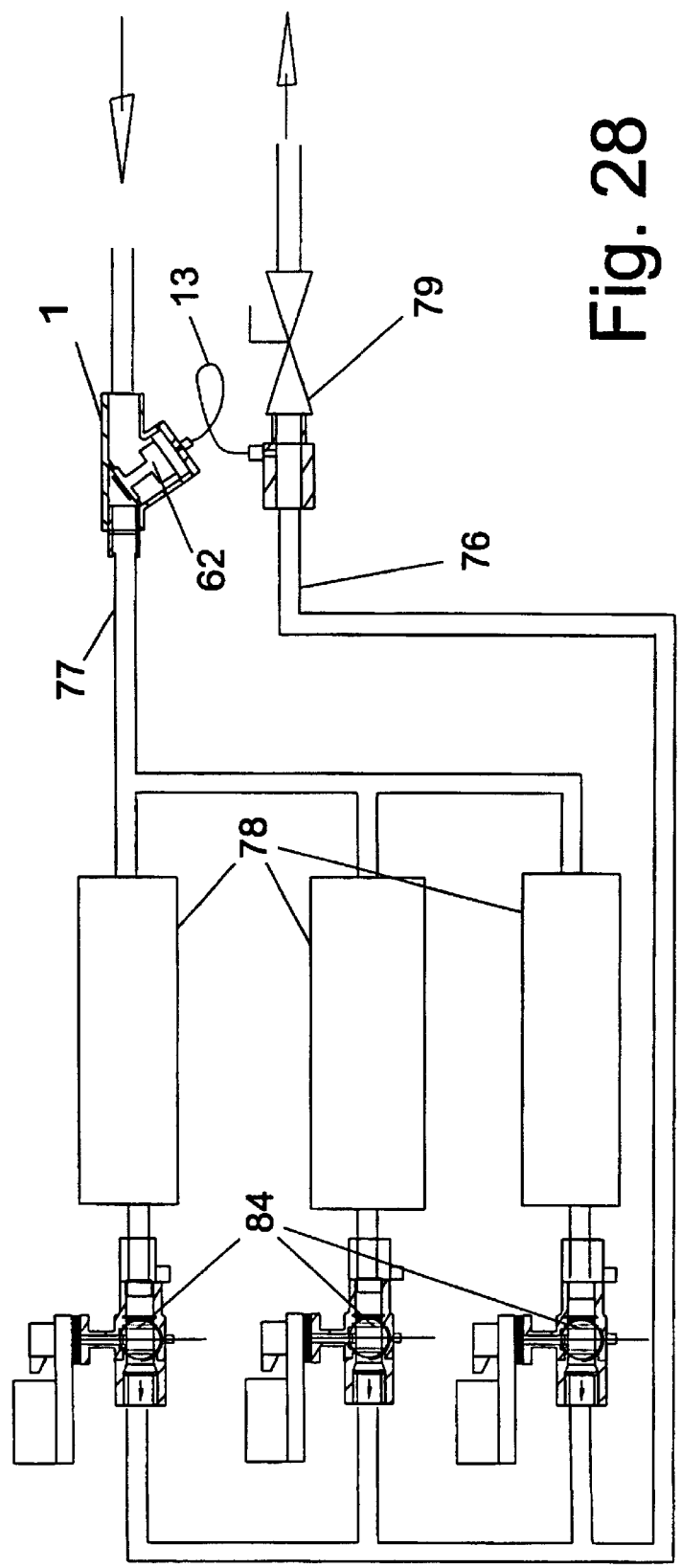

FIG. 28 shows the APCV of FIG. 23 used as an ADPCV applied to control the differential pressure between a supply to and return from a group of heat transfer devices.

Figure 29:
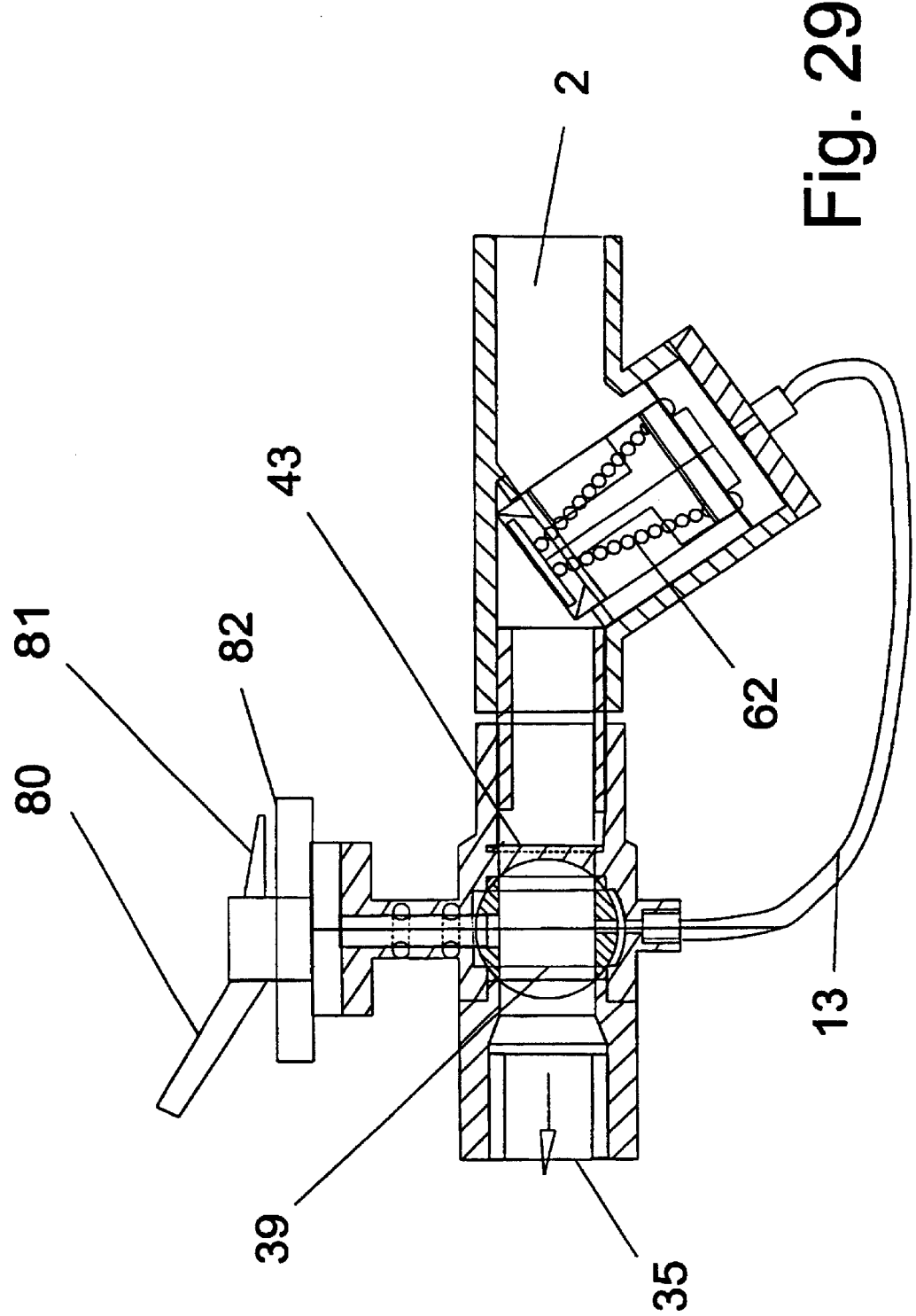

FIG. 29 is the same as FIG. 26, except that the valve is manually adjusted with a handle.

Figure 30:
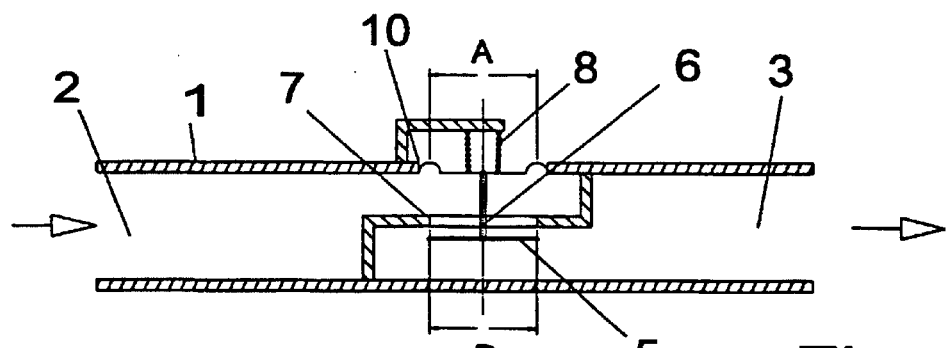

FIG. 30 shows the APCV applied to control the pressure in air handling systems. A compression spring is used, and its force adds to the weight of the diaphragm and the control disk.

Figure 31:
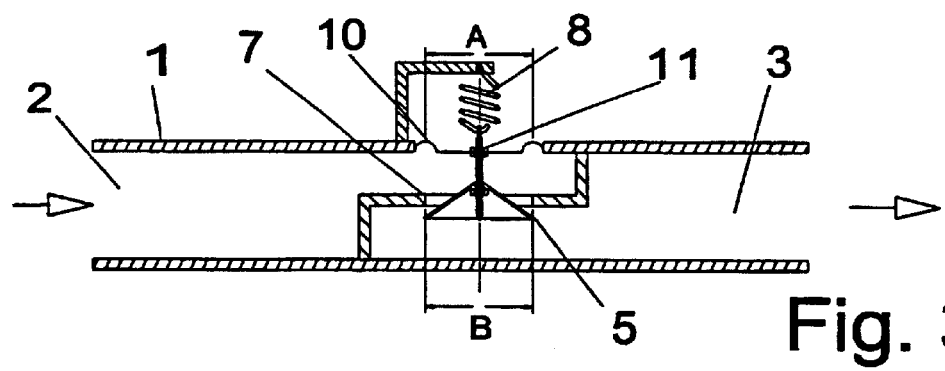

FIG. 31 shows the APCV applied to control the pressure in air handling systems. The control disk is shaped as a cone. An extension spring is used. The spring tension minus the weight of the diaphragm and the control disk determines the set-point of the pressure, which can be adjusted to very low values.

Figure 32:
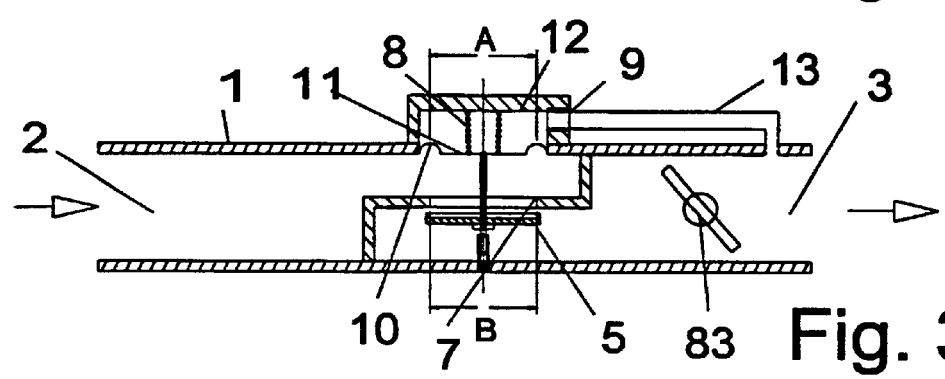

FIG. 32 shows the APCV of FIG. 30 applied as an ADPCV controlling the differential pressure across an air damper which is located downstream. Thereby, the air flow is independent of upstream and downstream pressure variations in the duct work.

Figure 33:
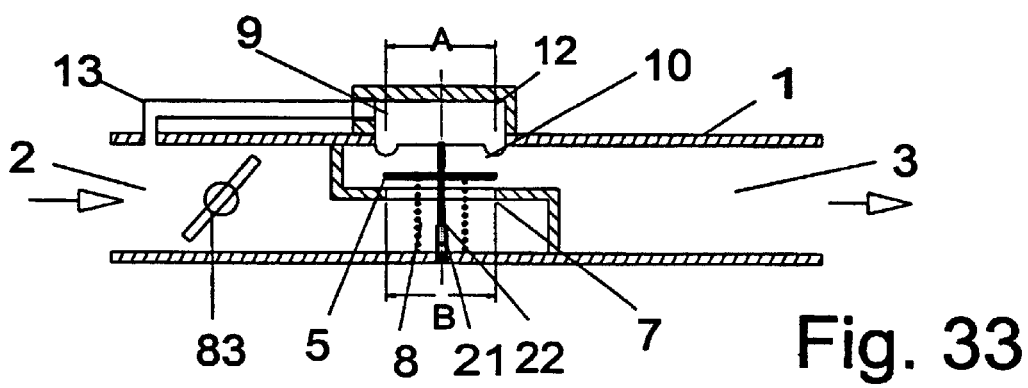

FIG. 33 is similar to FIG. 32 except that the air damper is located upstream of the ADPCV. It is of the type that has the control disk above the seat and controls the pressure between the air damper and the control disk.

DESCRIPTION OF THE PREFERRED EMBODIMENTS

Figure 1:
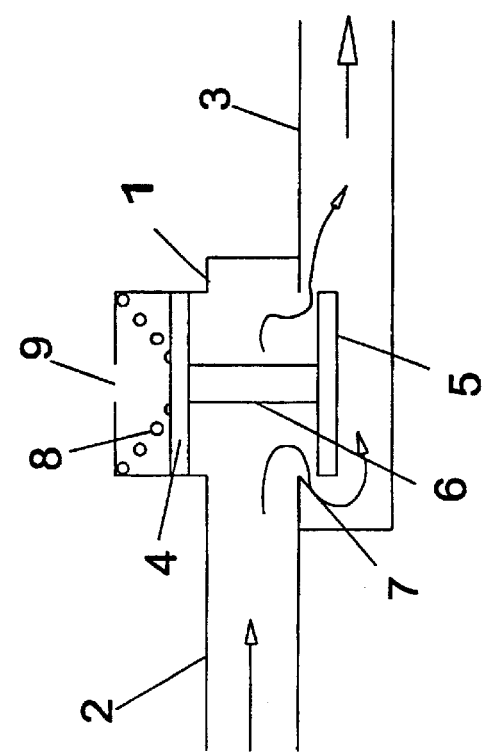
FIG. 1 shows a simplified schematic presentation of an APCV using a piston instead of a diaphragm. It is spring biased. The diameter of the piston is essentially the same as the control disk. The control disk is located under the seat. The downstream pressure is controlled.

See FIG. 1. It shows the APCV.

The APCV has a body (1) with a passageway for a fluid flow from an inlet (2) to an outlet (3). Intersecting the passageway there is a seat (7). Under the seat (7) there is a control disk (5), which is via a stem (6) is connected to a piston (4). On top of the piston (4) there is a spring (8) which pushes down. The spring and piston is enclosed in a cylinder with an opening (9) to the atmosphere.

The diameters of the piston (4), seat (7) and control disk (5) are identical. Therefore, the inlet (2) pressure P1 acts upon the underside of the piston with the same force as it acts upon the top side of the control disk (5). The two forces neutralize each other.

Downstream of the outlet (3) there are devices (not shown) connected that produces some resistance to the fluid flow.

The spring (8) pushes the piston, stem and control disk assembly down and opens the seat so the fluid can pass from the inlet (2) to the outlet (3). The outlet pressure (P2) increases and acts upon the underside of the control disk (5). The pressure (P2) increases until it upon the area of the underside of the control disk (5) produces an upward force strong enough to begin to compress the spring (8). The control disk (5) moves up closer to the seat (7) which increases the flow resistance. This reduces the outlet pressure until it produces over the control disk (5) an upward force that balances the spring force (8). Thus, the outlet pressure (P2) is determined by the spring force divided by the area of the control disk.

The control disk and piston can be made with very close tolerances, so the areas of the piston, seat and control disk can be made practically identical. This makes it possible to make the APCV independent of quite large variations of the inlet pressure (P1).

Unfortunately, a small clearance is needed between the piston and cylinder, which will cause a leakage. Therefore, the flow can be controlled down to a certain minimum flow only. Also there is a risk that dirt particles may accumulate in the clearance and cause friction. Therefore, in many cases it can be better to use a diaphragm. The choice, piston or diaphragm depends upon the requirements for each application. Foe simplicity, in the following description the diaphragm alternative is shown only.

FIG. 2 shows an APCV with a diaphragm (10) instead of piston. This eliminates leakage and reduces the sensitivity for dirt. The diaphragm (10) has a support (11), which is connected to the stem (6).

The control disk (5) has a chamfered surface facing the underside of the seat (7). The purpose of the chamfered surface is to guide the control disk (5) so it finds its correct position in the center of the seat (7).

The diaphragm (10) has one convolute around the perimeter. The average of the outside and inside diameters of the convolute determines approximately the (hydraulic) effective area of the diaphragm (10).

When the valve is closed, the bottom edge of the seat (7) touches the chamfered surface of the control disk (5) along a very thin contact line. This ensures a relatively high contact pressure and a tight shut-off. (It can be advantageous if either the seat or the chamfered surface is made of a semi-resilient material.)

When closed, the effective area of the control disk (5) is determined by the diameter of the contact line. The control disk (5) should be sized so its effective area is close to the effective area of the diaphragm. The smaller the difference is the less the outlet pressure (P2) is affected by variations in the inlet pressure P1. The outside diameter of the control disk (5) should be only slightly larger than the diameter of the contact line. Otherwise, the outlet pressure (P2) will change at high flow rates.

In the following description diaphragms are discussed. However, it is also applicable to pistons, disks, bellows and other pressure sensitive members. The surface of control disk or cup and the pressure sensitive member can have any useful shape. For example, circular, oblong, triangular, rectangular, quadratic, rectangular and polygon.

See FIG. 3. It is similar to FIG. 2 except that the spring is replaced by a regulated air pressure.

A regulated pressure supply (14) has a connection (13) to the diaphragm chamber (12).

The APCV balances the air pressure (P3) in the diaphragm chamber (12) by an essentially equal outlet pressure (P2).

See FIG. 4. It is similar to FIG. 2 except that the spring is replaced by a column (15) of liquid which excerpts a pressure upon the diaphragm (10).

The APCV balances the liquid pressure (P3) in the diaphragm chamber (12) by an essentially equal outlet pressure (P2).

See FIG. 5. It is similar to FIG. 2 except that the spring is replaced by a weight (16) which excerpts a force upon the diaphragm (10).

The APCV balances the weight by a corresponding outlet pressure (P2).

FIG. 6 is similar to FIG. 2 except that the seat (7) has a chamfered surface facing down against the control disk (5) which has an upper edge (17) which can contact the chamfered surface of the seat (7)

When the valve is closed, the top edge of the control disk (5) touches the chamfered surface of the seat (7) along a very thin contact line The inner diameter of the seat (7) should be only slightly smaller than the diameter of the control disk (5). Otherwise, the outlet pressure (P2) will change at very high flow rates.

FIG. 7 is identical to FIG. 2 but with greater detail. It is clearly shown that the seat (7) has a pointed edge facing the control disk (5).

FIG. 8 is similar to FIG. 7, except nether the seat (7) or the control disk (5) has a chamfered surface. Instead, the control disk (5) has a slightly larger diameter than the seat (7). At the top side perimeter of the control disk (5) there is a ridge (19) with a pointed edge facing up against the bottom of the seat (7), which as a flat surface (20) (of a semi-resilient material, optional).

The control disk (5) is guided by a pin (21) which slides inside a guide bushing (22).

As an alternative (not shown), the bottom side perimeter of the seat (7) has a ridge (19), with a pointed edge facing down against the top of the control disk (5), which as a flat surface (20) (of a semi-resilient material, optional).

In FIGS. 1–8 the diaphragm (10), stem (6) and control disk (5) assembly is free floating and makes no contact (except a slight contact with the guide bushing (22) in FIG. 8) with any stationary part until it eventually makes contact with the seat (7). Therefore, these APCV operate with no (or negligible) friction, and therefore can operate accurately with a relatively small diaphragm and spring.

The outlet pressure will increase, if there is any leakage between the control disk and the seat, when the downstream line is shut-off. This increases the force acting upon the control disk until it is completely closed against the seat, and the leakage is eliminated.

The following applies to FIGS. 1–8.

Calculation of the set-point of the pressure control of the outgoing pressure P2.

Incoming pressure=P1
Outgoing pressure=P2
Pressure in the diaphragm chamber=P3
Spring tension=S
Effective area of diaphragm=A
Effective area of control disk=B
A=B $$P2=(P3 \times A+S)/A=P3+S/A$$

Calculation of the influence of the incoming pressure P1 on the outgoing pressure P2, at different effective areas. P3 atmospheric pressure.

This following applies to FIGS. 1–8.

Effective diaphragm area=A Effective disk area=B. Spring tension=S.

(The weight of the diaphragm, shaft, spring and control disk are included in the spring tension. The weight either adds to or subtracts from the spring tension. However, in most applications the weight is inconsequential.)

$$P2=(S-P1(B-A))/A$$

Example 1; A=10 sq.in B=10 sq.in S=100 lb

When $P1$=10 psig $P2$=((100−10(10−10))/10=10 psig

When $P1$=100 psig $P2$=((100−100(10−10))/10=10 psig

There is no change in P2 when P1 is increased from 10 to 100 psig.

Example 2; A=9 sq.in B=10 sq.in S=100 lb

When $P1$=10 psig $P2$=((100−10(10−9))/9=10 psig

When $P1$=100 psig $P2$=((100−100(10−9))/9=0 psig

P2 changes from 10 psig to 0 psig when P1 increases from 10 psi to 100 psig. It is obvious that it is important that the effective areas of the diaphragm and the disk are the same. Otherwise the accuracy is compromised.

See FIG. 9. It is a back pressure APCV and controls the inlet pressure (P1). The control disk (5) is located above the seat (7). The flow direction is reversed compared to FIGS. 1–8. The (upstream) inlet pressure (P1) acts upon the control disk (5) and together with the spring produces an upward force, which is balanced by the force produced by the (higher) pressure (P3) above the diaphragm (10). If instead, the pressure above the diaphragm is lower than the inlet pressure, the spring then is located above the diaphragm and pushes down. The lower part of the control disk (5) has an optional guide pin (22), which slides inside a guide bushing (21).

Calculation of the incoming pressure P1 in FIG. 9.

Incoming pressure=P1
Outgoing pressure=P2
Pressure in the diaphragm chamber=P3
Spring tension=S
Effective area of diaphragm=A
Effective area of control disk=B
A=B $$P1=(P3 \times A-S)/A=P3-S/A$$

FIG. 10 is similar to FIG. 6, but with greater detail. In order to pass a larger flow rate the control disk (5) need to move away from the seat (7). This expands the spring (8)

and the spring force drops. A lower spring force means that the outlet pressure (P2) drops. In order to reduce the variation, a spring with a relatively small spring rate should be used, because its force drops less for a given expansion. In order to produce the required spring force, a long cylindrical spring is needed. Alternatively, a conical spring (8) that has been made with a linear characteristics can be used. It require little space because it can be made quite long and then compressed so it is almost flat and still provide a small spring rate.

FIG. 11 is similar to FIG. 3, but with greater detail. The diaphragm (10) is biased by a regulated pressure source (14). The outlet pressure (P2) will assume the essentially same value as the pressure (P3) in the diaphragm chamber (12).

Biasing by a regulated pressure gives the advantage of providing the same force from the diaphragm regardless of the movement of the control disk (5). Therefore, the outlet pressure is not affected by how much the control disk (5) need to open.

In order to achieve a good control where the outlet pressure (P2) is unaffected by the inlet pressure (P1), the control disk (5) must make contact with the seat (7) along a thin and well defined contact line. Otherwise, the effective area will change as the control disk (5) moves.

For example, if both the seat (7) and control disk (5) have same angle conical surfaces (as a valve and seat in a car engine), then the contact line will be quite wide. The contact pressure will be low and the valve will not provide a tight shut-off until the outlet pressure has increased significantly above the set-point.

The contact line is the surface of a frustum of a cone, which has a small and a large diameter. When the valve is closed the effective area of the control disk (5) is determined by the smaller diameter. As the control disk (5) moves away from the seat (7), the effective area is based upon a diameter with a value that varies somewhere in between the small and large diameters. The result is a poor control of the pressure.

The geometrical shapes of seats and control disks shown in the different figures represents only some examples of the geometrical shapes that can be used. For example it is possible to use two conical surfaces as long as their angles are different at the point of contact.

In order to achieve a good accuracy, it is important that the two surfaces make contact along a well defined thin line.

See FIG. 12. It shows an APCV used for control of the liquid level in a tank. For example a toilet tank (25).

The APCV is connected (26) near the bottom of the tank (25), which has a lid (30). A rod (28) runs through the lid to a valve (27) at the bottom of the tank.

The spring (8) provides the force to balance the liquid pressure under the control disk (5) to a pressure that corresponds to a predetermined level.

The tank is emptied by momentarily opening the valve (27). The pressure under the control disk (5) drops and it opens. The tank is filled by the APCV. The control disk closes, when the pressure corresponds to the predetermined level.

By adding an optional magnet (23) to the APCV, the control action is more positive. The APCV will operate with a hysteresis and a tight shut-off is accomplished.

The tank (25) has an overfill pipe (29) in the event the APCV should fail.

The diaphragm chamber (12) is connected by a small pipe (24) to the bottom of the valve (27). Thereby any leakage from the diaphragm (10) is drained.

The APCV can control the liquid level in a closed tank by connecting the small pipe to the top of the tank.

FIG. 13 shows the APCV located at a level slightly below the desired liquid level. From the outlet (3) a suction pipe (32) is running to the bottom of the tank (25). The spring (8) is small compared to the spring in FIG. 12 (or eliminated).

When the tank (25) is emptied, the pressure in the suction pipe (32) drops below the atmospheric pressure. The control disk (5) opens.

When the tank is filled, the pressure in the suction pipe (32) rises and when the level comes close to the desired level the spring begins to compress, whereupon the magnet force increases and the APCV closes.

The magnet (33) makes the control action positive. The magnet introduces a hysteresis. When the liquid level begins to drop, the magnet (33) holds the control disk (5) closed by the attracting force upon the stem (6). Eventually the level has dropped so much that the magnetic force is overcome and the control disk opens. When the level rises, the spring (8) holds the control disk open until the level high enough to begin to move the control disk, diaphragm and stem up. Then the magnetic attraction pulls the stem up and the valve closes and gives a positive shut-off.

The magnet (33) is optional, but without it the shut-off is gradual instead of positive.

The system will not work unless the suction pipe (32) is filled with liquid. By pressing down a spring loaded push button (34), the valve is momentarily opened and the suction pipe is purged from air.

A cup (31) at the end of the suction pipe (32) prevents air from entering the suction pipe when the liquid level is low.

In FIG. 12 and 13, the supply water pressure should be relatively constant, otherwise inlet pressure variations may affect the level. If needed, an extra pressure regulator should be used.

FIG. 14 shows a simplified schematic presentation of a PICV, which consists of a control valve and an ADPCV.

The fluid flow enters from the left through connection (35) and passes first through a control valve (36) and then an ADPCV before exiting the outlet (3).

The ADPCV is of the same type that is shown in FIG. 9, but it is not referenced to the atmosphere, instead the connection (9) is connected by a pipe (13) to a point just upstream of the control valve (36). Therefore, it is not an APCV but an ADPCV. NOTE! It is located downstream of the control valve (36).

This ADPCV controls its inlet (2) pressure (P1) to value which is equal to the pressure (P3) just upstream of the control valve (36), minus the spring force (S) divided by the effective area of the diaphragm (A).

The differential pressure across the control valve (36) is the difference between the pressures P3 and P1, and is maintained at a constant value by the ADPCV.

With a constant differential pressure across the control valve (36) each degree of opening correspond to a specific flow rate, regardless of pressure variations between the inlet of the control valve (35) and the outlet (3) of the ADPCV.

The control valve (36) has an actuator (37) which may be manually operated or, automatic and responds to control signals.

FIG. 15 is similar to FIG. 14, but more detailed. The control valve and ADPCV are built together in one body (1).

The control valve is a ball valve. It has a ball (39) suspended between two seats (38). It is operated 0–90 degrees by a shaft (41), which is sealed by an O-ring (40). An optional characterizing disk (43) (see for example U.S. Pat. 6,039,304) determines the flow characteristics.

The control disk (5) is shaped as a cup with its opening facing up against the bottom of the seat (7). The opening has a pointed edge and is flared out, so it has an area that is the same as the effective area of the diaphragm.

A diaphragm (10) rests against the control disk (5) and a cylinder (45).

A spring (8) presses against the bottom of the control disk (5).

The diaphragm is of a rolling type with a convolute. The distance between the convolute and the seat is shorter than the distance between the bottom of the control disk and the seat, by the distance "C". This tends to stabilize the control disk (5) so it points up against the seat (7).

The ball (39) has a small hole (44) facing down to a connection channel (13) which leads to the diaphragm (10). Thus the pressure (P3) inside the ball (39), which also is the pressure in front of the characterizing disk (43), is communicated to the diaphragm (10).

The inlet (2) pressure (P1) is controlled to a value which is equal to the pressure (P3) just in front of the characterizing disk (43) minus the spring force (S) divided by the effective area of the diaphragm (A).

The differential pressure across the characterizing disk (43) is the difference between the pressures P3 and P1, and is maintained at a constant value by the ADPCV.

A specific flow rate is provided for each degree of opening of the ball (39) regardless of pressure variations between the inlet (35) of the control valve, and the outlet (3) of the ADPCV (as long as the inlet pressure is above a certain minimum value, which depends upon the spring tension).

The small hole (44) in the ball (39) eliminates the need to connect the communication channel (13) to a point upstream of the ball (39). Thereby, a connection through the nipple at the inlet (35) is avoided. The nipple is screwed into the body (1) and it would be very difficult to exactly line up a channel in the nipple with the channel (13) in the body (1).

The spring (8) tension can be adjusted by a screw (42). This adjusts the differential pressure set-point of the ADPCV. A higher set-point increases the flow rate.

FIG. 16 shows a simplified schematic presentation of a PICV, which comprises a control valve connected in series with an ADPCV. The ADPCV is upstream of the control valve and maintains a constant differential pressure across the control valve (36).

The fluid flow enters from the left through connection (2) and passes first through the ADPCV and then the control valve (36) before exiting the outlet (35).

The ADPCV is of the same type that is shown in FIG. 7, but it is not referenced to the atmosphere, instead the connection (9) is connected by a pipe (13) to a point just downstream of the control valve (36). Therefore, it is not an APCV but an ADPCV. NOTE! The ADPCV is located upstream of the control valve (36).

This ADPCV controls its outlet pressure (P2) to value which is equal to the pressure (P3) just downstream of the control valve (36), plus the spring force (S) divided by the effective area of the diaphragm (A).

The differential pressure across the control valve (36) is the difference between the pressures P1 and P3, and is maintained at a constant value by the ADPCV.

With a constant differential pressure across the control valve (36) each degree of opening correspond to a specific flow rate, regardless of pressure variations between the inlet (2) of the ADPCV and the outlet (35) of the control valve (36).

The control valve (36) has an actuator (37) which may be manually operated or, automatic and responds to control signals.

FIG. 17 is the same as FIG. 16, but with greater detail. The ADPCV is built as one unit which is inserted into a recess in the body (1). Thus the ADPCV can be completed separate from the body (1). The ADPCV assembly is detachable and can easily be replaced or removed for service or cleaning.

The ball (39) has a small hole (44) which connects the bore through the ball with the cavity between the ball and the body. A channel connects the cavity with the diaphragm (10).

A characterizing disk can be used. If it is eliminated the ball should be sized so it provides a suitable flow resistance. For example, 2 psi pressure drop at 6 GPM, for a ½" PICV, which correspond to a flow capacity CV=4.24. The spring (8) is adjusted so the ADPCV operates at 2 psi.

FIG. 18 is similar to FIG. 17, but with a few modifications.

To save space a conical spring (8) is used. The plug (46) that seals the opening for the ADPCV assembly has an air-vent (47). It removes trapped air from the diaphragm area.

The flow capacity of the ball is reduced, without using any characterizing disk. This is done by installing the ball (39) with a slanted position, so the ball always is operated with its fluid flow passageway at an angle different from perpendicular to the axis of rotation of the ball.

The shaft (41) which turns the ball (39) has a blade that fits a grove in the ball. To operate the ball at a slanted position, the grove should have at an angle that is offset from perpendicular to the bore through the ball.

FIG. 19 shows the ball (39) in greater detail.

One side (50) of the ball (39) is flattened. Thereby, this side of the ball will still be open when the opposite side just begins to close against the seat. In FIG. 18 it is the downstream side of the ball that is flattened. This ensures that the upstream side of the ball is the first to close. The ball needs to be flattened only slightly.

Instead of flatten the side, the bore through the ball can be slightly wider at one side. Alternatively, there can be a notch in the side of the downstream opening.

At the bottom side of the ball (39) a hole (44) is drilled. It provides communication between the inside of the ball and the cavity surrounding it. The cavity is by a channel connected to the diaphragm (10).

The grove (48) mates with a blade at the end of the shaft (41). The hole (44) can be eliminated if the grove (48) breaks through into the bore of the ball (39).

"Alternative A" shows the grove (48) at the standard perpendicular position.

"Alternative B" shows the grove (48) an offset position, which will give the ball (39) a slanted orientation.

FIG. 20 shows an APCV or ADPCV assembly. The diaphragm (10) is of a rolling type and rests against a support (11). The outside rests against a ring (58) with a cylindrical inside surface. The ring has an annular recess for the bead around perimeter of the diaphragm (10).

The ring (58) and diaphragm is fastened to one end of a tubular body (52), by a ring shaped body (54). The ring shaped body (54) also holds the spring (8). The top has side openings (57) so the pressure of the control valve can reach the diaphragm.

The opposite end of the tubular body (52) has a seat (7) against which the control disk (5) operates. The tubular body (52) has openings (53) for the fluid flow in the sides.

Between the control disk and the seat a disk (50) of semi-resilient material may be disposed.

The stem (6) is attached to the control disk (5) via a wave spring (51). This reduces the force by which the control disk can press against the seat, because the movement of the stem (6) is limited by a stop (shown as plug (46) in FIG. 22).

O-rings (52 and 59) seals the assembly against the recess of the body.

FIG. 21 shows an APCV or ADPCV assembly using a piston (4) instead of a diaphragm.

FIG. 22 is similar to FIGS. 17 and 18, except that the control valve is a "top entry" ball valve. Therefore, the valve body is made as one unit, without any nipple. The pressure channel (13) connects the diaphragm (10) to the downstream side of the control valve.

The recess for the ADPCV assembly (62) is covered by a plug, which can be secured by a retaining ring. The conical recess for the top entry ball (39) and seats (63) is covered by a lid (63), which is fastened by screws (65).

FIG. 23 shows an APCV or ADPCV assembly in an Y-shaped body. The assembly is built as an insert, which is adapted for use in an Y-shaped body.

Because of the available space, a cylindrical spring (8) can be used. It presses against the control disk (5) and a support (66).

FIG. 24 shows a simplified schematic presentation of a PICV. The control valve is a globe valve. The ADPCV is located upstream of the control valve and controls the differential pressure across the control valve.

The diaphragm (10) of the ADPCV is via a channel (13) connected to the downstream side of the control valve (68). A spring (69) is located between the plug (68) of the globe valve and the control disk (5) of the ADPCV. The tension of this spring (69) depends upon the position of the plug (68), and determines the set-point of the ADPCV. When the plug (68) moves down towards the seat (70) and reduces the opening, the spring (69) is compressed. Its force opposes the main spring (8) and the ADPCV will operate with a lower differential pressure across the control valve.

The variable differential pressure modifies the valve characteristics of the globe valve. The rangeability is also improved because the pressure is reduced as the valve closes.

The plug (68) can have a contoured body to provide a specific characteristics, for example; linear or equal percent. Alternatively, the plug (68) can be a flat disk which gives an inherent "quick opening" characteristics. However, the inherent characteristics is modified by the variable differential pressure caused by the spring (69).

The spring (69) can have a linear characteristics, or a non-linear characteristics (for example; exponential) in order to produce a specific characteristics.

The differential pressure can rise to very high values across a conventional control valve, and a quite high force is required to operate the valve.

An additional advantage with this type of PICV is that a in many cases a smaller and less costly actuator is needed, compared to a standard control valve. The reason is that the differential pressure across the control valve is controlled to a lower value than the total differential pressure across the PICV. Therefore, the force needed to operate the plug (68) in the PICV is quite low compared to a similar plug in a conventional control valve.

FIG. 25 is similar to FIG. 24, but with greater detail. The ADPCV (62) is built in the form of an insert that fits in a recess under the seat (70) of the globe valve.

In the recess a tubular body (71) is fitted. It has flow openings (72) in the side.

The recess in the body (1) is covered by a plug (46).

FIG. 26 shows a PICV with the APCV of FIG. 23 used as an ADPCV and piped together with a control valve. The diaphragm in the ADPCV is via an external pipe (13) connected to the downstream side of the control valve.

FIG. 27 shows a the PICV (75) of FIG. 26 applied to control the flow of chilled or hot water through a heat transfer device (78).

FIG. 28 shows the APCV of FIG. 23 used as an ADPCV (1 and 62) applied to control the differential pressure between a supply (77) to and return (76) from a group of heat transfer devices (78).

Regular control valves (84) are used. Because the differential pressure between the supply and return is controlled, the pressure variations across the control valves (84) are limited to the pressure drop across the heat transfer devices (78).

FIG. 29 is a PICV of the same type as FIG. 26, except that it is manually adjusted with a handle (80). The position of the handle (80) is indicated by a pointer (81) and a graduated disk (82).

FIG. 30 shows the APCV applied to control the pressure in air handling systems. The outlet (3) pressure is controlled. A compression spring (8) is used. It pushes down and its force adds to the weight of the diaphragm (10), stem (6) and the control disk (5). The pressure at the outlet is equal to the combined weight and spring force divided by the area of the control disk (5). The spring (8) can be eliminated to control at a lower pressure.

FIG. 31 shows the APCV applied to control the pressure in air handling systems. The outlet (3) pressure is controlled. The control disk (5) is shaped as a cone. An extension spring (8) is used. It pulls up with a force that is less than the weight of the control disk, diaphragm and stem. This weight minus the spring force divided by the area of the of the control disk is equal to the outlet pressure, which can be adjusted to very low values.

FIG. 32 shows the APCV of FIG. 30 applied as an ADPCV controlling the differential pressure across an air damper (83) which is located downstream. Thereby, the air flow is independent of upstream and downstream pressure variations in the duct work. It is a PICV for air flow.

FIG. 33 is similar to FIG. 32 except that the air damper (83) is located upstream of the ADPCV. It is of the type that has the control disk (5) above the seat (7).

The following pertains to FIGS. 1, 2, 6–10, 12–18, 20–32.

The spring tension determines the differential pressure across the control valve, which in turn determines the maximum flow rate. By providing means to adjust the spring rate, the maximum flow can be set. This means that a well defined relationship between the degree of opening of the valve and the flow rate can be adjusted.

The following pertains to PICV with actuator.

A valve operated by a proportional actuator has a well defined relationship between the control signal and the degree of opening of the control valve. Therefore there will be a well defined relationship between proportional control signal (for example; 2–10VDC or 4–20 mA) and the flow rate.

When a microprocessor based control system is used, a correction table can be applied to the control signal to convert it to a flow estimation. In a central processor the flow estimates from all the valves can be presented in conjunction with graphics showing the flow distribution in a hydronic system.

If the control signal is so called "three point floating" the control signal can not directly be used. Instead, the actuators can be provided with feedback potentiometers, which provides a feedback signal to the microprocessor based control system. The feedback signal uses the above described table and is recalculated to a flow estimate.

The maximum flow rate can also be adjusted by limiting the opening of the pressure independent control valve. One way of doing this is to limit the control signal to the actuator. An other way is to use adjustable end stop, so the ball valve does not open fully. However, in this case a feedback potentiometer should be used if information about the flow rate is desired.

The following pertains to all of the present invention.

While particular embodiments of the present invention have been described in some detail above, changes and modifications may be made in the illustrated and described embodiments without departing from the form or spirit of the invention. It is therefore intended that the following claims cover all equivalent modifications and variations as fully within the scope of the invention as defined by the claims.

I claim:

1. A pressure independent fluid flow regulating valve providing a substantially constant flow rate for each position of an adjustable throttle means regardless of changes in line fluid pressure, comprising:
   a valve body having an inlet and an outlet, forming a flow passage through said valve body;
   an adjustable throttle means disposed in said fluid passage to vary the open area of said fluid passage;
   downstream of said throttling device a seat orifice intersecting said flow passage;
   a moveable assembly, comprising a disk or cup connected to, and operated by a pressure sensing means member comprising a diaphragm;
   the disk or cup is located downstream of the seat with which it interacts to vary the flow resistance;
   said disk or cup has a slightly larger diameter than the opening in the seat;
   the effective surface area of the disk or cup, is essentially the same as the effective surface area of said pressure sensing means;
   the pressure sensing means operates inside a cylinder or chamber which it divides in two portions, one portion is connected to the outlet, the other portion via a reference pressure passage connected to a point upstream of the throttle means;
   spring means biases said moveable assembly.

2. A pressure independent fluid flow regulating valve according to claim 1 having a valve body with a recess intersecting the flow passage; a detachable unit comprising at least, a seat orifice and a moveable assembly.

3. A pressure independent fluid flow regulating valve according to claim 1 using a globe valve as adjustable throttle means.

4. A pressure independent fluid flow regulating valve according to claim 3 using a globe valve having a plug as adjustable throttle means and between the its plug and the disk or cup of the moveable assembly a spring is disposed, which changes the spring bias of the moveable assembly with respect to the position of said plug.

5. A pressure independent fluid flow regulating valve according to claim 1 using a ball valve as adjustable throttle means.

6. A pressure independent fluid flow regulating valve according to claim 5 with the pressure inside the bore of the ball communicated to the pressure sensing member of the moveable assembly.

7. A pressure independent fluid flow regulating valve according to claim 5 with a ball having a bore with its length axis at an angle different from perpendicular to its axis of rotation.

8. A pressure independent fluid flow regulating valve according to claim 5 or 6 having a characterizing disk in the bore of the ball or in the seat area.

9. A pressure independent fluid flow regulating valve according to claim 5 with a one piece body using a top entry ball.

10. A pressure independent fluid flow regulating valve according to claim 5 with a ball having a at least one characterizing disk in the bore of the ball and or in the seat area.

11. A pressure independent fluid flow regulating valve according to claim 5 where the ball or seat has a circular, oblong, triangular, rectangular, quadratic, rectangular or polygon shaped opening for the fluid flow.

12. A pressure independent fluid flow regulating valve according to claims 1 where said spring has means to adjust the spring tension.

13. A pressure independent fluid flow regulating valve according to claim 12 where said spring has means to externally adjust the spring tension.

14. A pressure independent fluid flow regulating valve according to claim 1, said shaft is fitted with a handle for manual adjustment.

15. A pressure independent fluid flow regulating valve according to claim 1 provided with an actuator to operate said shaft in response to control signals.

16. A pressure independent fluid flow regulating valve according to claims 14 or 15, fitted with a pointer and scale graduated in units of flow rate.

17. A pressure independent fluid flow regulating valve according to claim 1 provided with adjustable means to limit the movement of stem.

18. A pressure independent fluid flow regulating valve according to claims 1, provided with an actuator to operate said shaft, and said actuator has adjustable means to limit the movement of the stem.

19. A pressure independent fluid flow regulating valve according to claim 2, wherein said detachable unit is preassembled and comprises a seat orifice, disk or cup, moveable assembly and diaphragm.

20. A pressure independent fluid flow regulating valve according to claim 5 with pressure regulator and ball valve built into one main valve body and a nipple.

21. A pressure independent fluid flow regulating valve providing a substantially constant flow rate for each position of an adjustable throttle means regardless of changes in line fluid pressure, comprising:
   a valve body having an inlet and an outlet, forming a flow passage through said valve body;
   an adjustable throttle means disposed in said fluid passage to vary the open area of said fluid passage;
   upstream of said throttling device a seat orifice intersecting said flow passage, a moveable assembly, comprising a disk or cup connected to, and operated by a pressure sensing means;
   the disk or cup is located downstream of the seat with which it interacts to vary the flow resistance;
   said disk or cup has a slightly larger diameter than the opening in the seat:
   the disk or cup is joined with the pressure sensing means with a stem;
   the effective surface area of the cup or disk, is essentially the same as the effective surface area of said pressure sensing means;
   the pressure sensing means operates inside a cylinder or chamber which it divides in two portions, one portion is connected to the inlet, the other portion via a reference pressure passage connected to a point downstream of the throttle means;
   spring means biases said moveable assembly.

22. A pressure independent fluid flow regulating valve according to claims 1 or 21, wherein the adjustable throttle means are adjusted by an actuator responding to signals.

23. A pressure independent fluid flow regulating valve according to claims 1 or 21, wherein the adjustable throttle means are adjusted by a graduated manual handle.

24. A pressure independent fluid flow regulating valve according to claim 21 having a valve body with a recess intersecting the flow passage; and a detachable unit comprising at least, a seat orifice and a moveable assembly.

25. A pressure independent fluid flow regulating valve according to claim 21 using a globe valve as adjustable throttle means.

26. A pressure independent fluid flow regulating valve according to claim 25 using a globe valve having a plug as adjustable throttle means and between the plug and the disk or cup of the moveable assembly a spring is disposed, which changes the spring bias of the moveable assembly with respect to the position of said plug.

27. A pressure independent fluid flow regulating valve according to claim 21 using a ball valve as adjustable throttle means.

28. A pressure independent fluid flow regulating valve according to claim 27 with the pressure inside the bore of the ball communicated to the pressure sensing member of the moveable assembly.

29. A pressure independent fluid flow regulating valve according to claim 27 with a ball having a bore with its length axis at an angle different from perpendicular to its axis of rotation.

30. A pressure independent fluid flow regulating valve according to claim 27 or 28 having a characterizing disk in the bore of the ball or in the seat area.

31. A pressure independent fluid flow regulating valve according to claim 27 with a one piece body using a top entry ball.

32. A pressure independent fluid flow regulating valve according to claim 27 with a ball having a at least one characterizing disk in the bore of the ball and or in the seat area.

33. A pressure independent fluid flow regulating valve according to claim 21 where said spring has means to adjust the spring tension.

34. A pressure independent fluid flow regulating valve according to claim 33 where said spring has means to externally adjust the spring tension.

35. A pressure independent fluid flow regulating valve according to claim 21, said shaft is fitted with a handle for manual adjustment.

36. A pressure independent fluid flow regulating valve according to claim 21 provided with an actuator to operate said shaft in response to control signals.

37. A pressure independent fluid flow regulating valve according to claim 35 or 36, fitted with a pointer and scale graduated in units of flow rate.

38. A pressure independent fluid flow regulating valve according to claim 21 provided with adjustable means to limit the movement of stem.

39. A pressure independent fluid flow regulating valve according to claim 21, provided with an actuator to operate said shaft, and said actuator has adjustable means to limit the movement of the stem.

* * * * *